United States Patent
Srey et al.

(10) Patent No.: US 9,911,159 B1
(45) Date of Patent: *Mar. 6, 2018

(54) ENCOURAGING SAFE DRIVING USING A REMOTE VEHICLE STARTER

(71) Applicant: Allstate Insurance Company, Northbrook, IL (US)

(72) Inventors: Rothana Srey, Dekalb, IL (US); Matthew James Manzella, Glen Ellyn, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/216,975

(22) Filed: Jul. 22, 2016

Related U.S. Application Data

(63) Continuation of application No. 14/689,637, filed on Apr. 17, 2015, now Pat. No. 9,421,864, which is a continuation of application No. 13/791,362, filed on Mar. 8, 2013, now Pat. No. 9,031,545.

(51) Int. Cl.
  *G06Q 40/08* (2012.01)
  *F02N 11/10* (2006.01)

(52) U.S. Cl.
  CPC ........... *G06Q 40/08* (2013.01); *F02N 11/101* (2013.01); *F02N 2200/10* (2013.01)

(58) Field of Classification Search
  CPC .... G06Q 40/08; F02N 11/101; F02N 2200/10
  USPC .......................................................... 705/4
  See application file for complete search history.

(56) References Cited

U.S. PATENT DOCUMENTS

| | | | |
|---|---|---|---|
| 4,533,962 A | 8/1985 | Decker et al. |
| 5,548,273 A | 8/1996 | Nicol et al. |
| 5,797,134 A | 8/1998 | McMillan et al. |
| 6,064,970 A | 5/2000 | McMillan et al. |

(Continued)

FOREIGN PATENT DOCUMENTS

| | | | |
|---|---|---|---|
| DE | 102005023570 A1 | 11/2006 |
| EP | 2165321 A1 | 3/2010 |

(Continued)

OTHER PUBLICATIONS

Darnbrough, J. (2008). Security and tracking system. Australian Mining, 00(00), 0. Retrieved from https://dialog.proquest.com/professional/docview/676851296?accountid=142257 on Oct. 13, 2017.*

(Continued)

*Primary Examiner* — Kito R Robinson
(74) *Attorney, Agent, or Firm* — Banner & Witcoff, Ltd.

(57) ABSTRACT

A method of encouraging safe driving of a vehicle using a remote starter device installed at a vehicle is provided. The remote starter device determines whether it is in signal communication with a remote starter application operating at a mobile computing device separate from the remote starter device. When the remote starter device is in signal communication with the remote starter application, the remote starter device permits ignition of the vehicle. When the remote starter device is not in signal communication with the remote starter application, the remote starter device prevents ignition of the vehicle. The remote starter application may present to a driver of the vehicle an insurance rate for taking a trip in the vehicle.

20 Claims, 11 Drawing Sheets

(56) References Cited

U.S. PATENT DOCUMENTS

| | | | |
|---|---|---|---|
| 7,697,917 | B2 | 4/2010 | Camp, Jr. et al. |
| 7,937,278 | B1 | 5/2011 | Cripe et al. |
| 8,097,974 | B2 | 1/2012 | Esaka et al. |
| 8,112,037 | B2 | 2/2012 | Ketari |
| 8,280,752 | B1 | 10/2012 | Cripe et al. |
| 8,311,858 | B2 | 11/2012 | Everett et al. |
| 8,478,237 | B1* | 7/2013 | Stenta ............... H04M 1/67 340/438 |
| 9,031,545 | B1 | 5/2015 | Srey et al. |
| 9,454,786 | B1* | 9/2016 | Srey ............... G06Q 40/08 |
| 2002/0128882 | A1 | 9/2002 | Nakagawa et al. |
| 2003/0187704 | A1 | 10/2003 | Hashiguchi et al. |
| 2007/0027726 | A1 | 2/2007 | Warren et al. |
| 2007/0109095 | A1* | 5/2007 | Robbins ............ B60R 25/045 340/5.72 |
| 2007/0136107 | A1 | 6/2007 | Maguire et al. |
| 2008/0203815 | A1 | 8/2008 | Ozawa et al. |
| 2009/0024419 | A1 | 1/2009 | McClellan et al. |
| 2009/0167524 | A1* | 7/2009 | Chesnut ............ G08C 17/02 340/539.19 |
| 2009/0178639 | A1 | 7/2009 | Gallarzo |
| 2010/0017236 | A1* | 1/2010 | Duddle ............. G06Q 40/08 705/4 |
| 2010/0030586 | A1 | 2/2010 | Taylor et al. |
| 2010/0105356 | A1 | 4/2010 | Ghazarian et al. |
| 2010/0131304 | A1* | 5/2010 | Collopy ........... G06Q 30/0224 705/4 |
| 2010/0174564 | A1 | 7/2010 | Stender et al. |
| 2010/0231037 | A1 | 9/2010 | Esaka et al. |
| 2011/0009107 | A1 | 1/2011 | Guba et al. |
| 2011/0086668 | A1* | 4/2011 | Patel ............... G08C 17/02 455/556.1 |
| 2011/0161116 | A1* | 6/2011 | Peak ............... G06Q 10/067 705/4 |
| 2011/0275321 | A1 | 11/2011 | Zhou et al. |
| 2012/0004933 | A1 | 1/2012 | Foladare et al. |
| 2012/0066007 | A1 | 3/2012 | Ferrick et al. |
| 2012/0173128 | A1* | 7/2012 | Peeler ............. G06Q 10/06 701/113 |
| 2012/0179493 | A1* | 7/2012 | Giordano .......... G06Q 40/08 705/4 |
| 2012/0252420 | A1 | 10/2012 | Czaja et al. |
| 2012/0315850 | A1 | 12/2012 | Oman et al. |
| 2013/0006675 | A1 | 1/2013 | Bowne et al. |
| 2013/0151132 | A1* | 6/2013 | Harumoto .......... F02N 11/0807 701/113 |
| 2013/0204645 | A1* | 8/2013 | Lehman ............ G06Q 40/08 705/4 |
| 2013/0344856 | A1 | 12/2013 | Silver et al. |
| 2014/0120890 | A1 | 5/2014 | Barrett et al. |

FOREIGN PATENT DOCUMENTS

| | | |
|---|---|---|
| EP | 2312552 A2 | 4/2011 |
| EP | 2363001 A1 | 9/2011 |
| EP | 2494418 A1 | 9/2012 |
| EP | 2515500 A1 | 10/2012 |
| WO | 2009002483 A1 | 12/2008 |
| WO | 2010062754 A1 | 6/2010 |
| WO | 2011053357 A1 | 5/2011 |
| WO | 2011057217 A2 | 5/2011 |

OTHER PUBLICATIONS

Darnbrough, J. (2008). Security and tracking system. Australian Mining, 00(00), 0. Retrieved from https://dialog.proquest.com/professional/docview/676851296?accountid=142257 on Oct. 13, 2017 (Year: 2008).*

Distracted Drivers Put Your Company at Risk. Automotive Fleet Magazine—Jun. 2012, vol. 51, No. 7, pp. 18-22.

Viper SmartStart. Retrieved from <https://play.google.com/store/apps/details?id=com.directed.android.viper&feature=search_result> on Jul. 2, 2013.

Insurers implement M2M usage-based insurance policies. Retrieved from <http://www.telecomengine.com/article/insurers-implement-m2m-usage-based-insurance-policies> on May 2, 2013.

6 Mobile Applications to Prevent Distracted Driving Accidents. Retrieved from <http://www.automotive-fleet.com/channel/safety-accident-management/article/story/2011/08/6-mobile-applications-to-prevent-distracted-driving-accidents.aspx?prestitial=1> on May 2, 2013.

The New Auto Insurance Ecosystem Telematics, Mobility and the Connected Car. Cognizant Reports. Aug. 2012.

Your Smartphone Will Replace Your Car Keys by 2015. Retrieved from <http://www.wired.com/autopia/2012/12/death-to-the-key-fob> on Jul. 2, 2013.

T-Mobile intros DriveSmart Plus service to block texting while driving, FamilyWhere to track down your kids. Retrieved from <http://www.engadget.com/2011/01/19/t-mobile-intros-drivesmart-plus-service-to-block-texting-while-d/> on Jul. 2, 2013.

Delivering Connected-Car Insurance with M2M On-Board Telematics Solutions. Applus Technologies. Telematics Learning Series. 2011.

Pay as You Drive Auto Insurance Explained. Retrieved from <http://insurance.about.com/od/Privvehicle/a/Pay-As-You-Drive-Auto-Insurance-Explained.htm> on Nov. 12, 2013.

The National Safety Commission Alerts—New Technology to Block Car Phone Use Far from Perfect. Jan. 27, 2009. Retrieved from <http://alerts.nationalsafetycommission.com/2009/01/new-technology-to-block-car-phone-use.php> on Nov. 12, 2013.

The Telematics Advantage: Growth, Retention and Transformational Improvement with Usage-Based Insurance. Cognizant 20-20 Insights. Jan. 2012.

NFC mobile phones replace hotel keys. Retrieved from <http://www.clarionstockholm.com/nfc-project> on Nov. 12, 2013.

New National Ad Campaign Highlights Sprint Drive First to Help Avoid Distracted Driving. Sprint Newsroom. Dec. 21, 2012. Retrieved from <http://newsroom.sprint.com/news-releases/new-national-ad-campaign-highlights-sprint-drive-first-to-help-avoid-distracted-driving.htm> on Nov. 12, 2013.

DriveSafe.ly ®—The App to Stop Distracted Driving. Retrieved from <http://www.drivesafe.ly/> on Nov. 12, 2013.

GuardChild—Cell Phone Text Blocker. Retrieved from <http://www.guardchild.com/2012/08/cell-phone-text-blocker/> on Nov. 12, 2013.

How Key2SafeDriving Blocks Texting and Driving. Retrieved from <http://www.key2safedriving.net/hiw.php> on Nov. 12, 2013.

Autonomous Labs. Retrieved from <http://autonomos.inf.fu-berlin.de/introduction/innolab> on Nov. 12, 2013.

Text Safely Widget. Retrieved from <https://play.google.com/apps/details?id=com.chich12&feature=search_result> on Nov. 12, 2013.

Safe Drive. Retrieved from <https://play.google.com/store/apps/details?id=com.incorporateapps.drivesafe.paid> on Nov. 12, 2013.

SMS Car Tracking Free. Retrieved from <https://play.google.com/store/apps/details?id=br.com.smscartracking.free&hl=en> on Nov. 12, 2013.

Anti Texting Safe Driving App. Retrieved from <https://play.google.com/store/apps/details?id=com.safedrivingassociation.everyonetexts&feature=search_result> on Nov. 12, 2013.

"Alaska Apps Launches Safe Driving App for Android—Silent Driver Ensures That Motorists Drive Without Distraction." PRWeb. Sep. 26, 2012. Retrieved from <http://www.prweb.com/releases/2012/9/prweb9938846.htm> on Nov. 12, 2013.

Control of the Car. Retrieved from <https://play.google.com/store/apps/details?id=a2u.AutomobileControlG&hl=en> on Nov. 12, 2013.

ProTextor. Retrieved from <https://play.google.com/store/apps/details?id=com.jjtwebconsulting.protextor4&hl=en> on Nov. 12, 2013.

Avanquest Mobile Technologies Announces New Full-Featured Safe Driving Application. Avanquest Software. Apr. 16, 2012.

(56) References Cited

OTHER PUBLICATIONS

Sprint Drive First.Retrieved from <https://play.google.com/store/apps/details?id=com.locationlabs.sdf&hl=en> on Nov. 12, 2013.
Usage-based insurance solutions. Intelligent Mechatronic Systems. Retrieved from <http://www.intellimec.com/m2m-telematics/usage-based-insurance-solutions/> on Nov. 12, 2013.
Insurance Tech Trends 2013. Deloitte. 2013.
Trends 2013—North American Insurance eBusiness and Channel Strategy. Forrester. May 16, 2013.
Top 10 Technolgy Trends Impacting Life and PC Insurers in 2013. Gartner. Mar. 27, 2013.
This App Turns Smartphones Into Safe Driving Tools. Mashable. Aug. 30, 2012. Retrieved from <http://mashable.com/2012/08/30/drivescribe-app-safe-driving> on Nov. 12, 2013.
Viper SmartStart Turns iPhone Into Remote Starter. Oct. 28, 2009. Retrieved from <http://wheels.blogs.nytimes.com/2009/10/28/viper-smartstart-turns-iphone-into-remote-starter> on Feb. 6, 2013.
Feb. 25, 2016—U.S. Non-Final Office Action—U.S. Appl. No. 13/791,287.
Mar. 3, 2016—U.S. Non-Final Office Action—U.S. Appl. No. 14/689,637.
Mar. 24, 2016—U.S. Response to Non-Final Office Action—U.S. Appl. No. 13/791,287.

\* cited by examiner

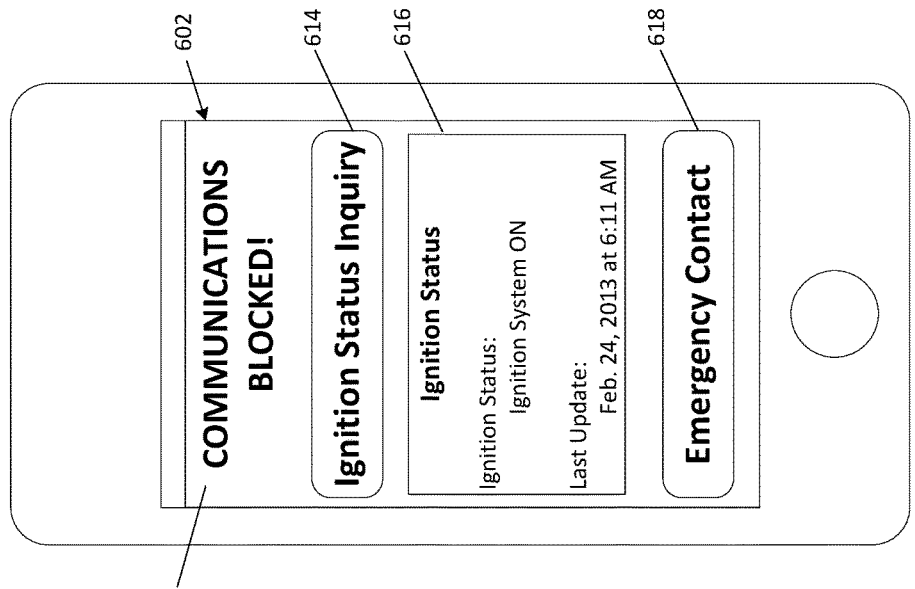
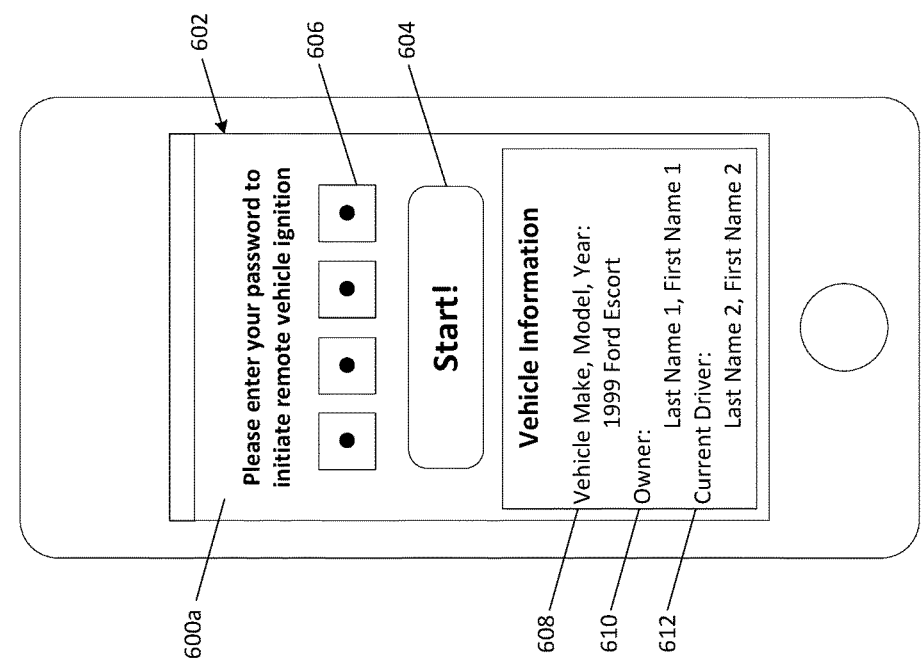
FIG. 6B
FIG. 6A

ENCOURAGING SAFE DRIVING USING A REMOTE VEHICLE STARTER

CROSS-REFERENCE TO RELATED APPLICATION

This application is a continuation of U.S. patent application Ser. No. 14/689,637 entitled "Encouraging Safe Driving Using a Remote Vehicle Starter" and filed on Apr. 17, 2015, which is a continuation of U.S. patent application Ser. No. 13/791,362 entitled "Encouraging Safe Driving Using a Remote Vehicle Starter" and filed on Mar. 8, 2013, which issued as U.S. Pat. No. 9,031,545 on May 12, 2015, each of which are herein incorporated by reference in its entirety.

TECHNICAL FIELD

Aspects of the disclosure relate generally to encouraging safe driving behaviors and more particularly to approaches to encouraging safe driving behaviors through the use of a remote vehicle starter and a remote starter application configured to operate at a mobile computing device.

BACKGROUND

Insurance providers have an incentive to encourage their customers to engage in safe driving behaviors. By engaging in safe driving behaviors, customers are less likely to be involved in an accident. Unsafe driving behaviors may include exceeding the speed limit, taking hard and fast turns, making hard stops, and operating a mobile phone while driving.

Software applications for blocking text messages at a mobile computing device are known but have drawbacks. For example, some text blocking applications may require a driver to voluntarily launch the application before driving. If the driver fails or chooses not to launch the text blocking application, the driver may have access to the text messaging features of the mobile computing device while driving. Therefore, a need exists for an approach to restricting communications at a mobile computing device during operation of the vehicle.

Additionally, in conventional practice, insurance providers may provide insurance coverage for a vehicle rather than for a driver of the vehicle. This may be due, in part, to challenges in determining the individual presently driving the vehicle. If an insurance provider could accurately identify the driver of a vehicle, alternative approaches to providing vehicle insurance based on the driver rather than the vehicle are possible.

SUMMARY

The following presents a simplified summary in order to provide a basic understanding of some aspects of the disclosure. The summary is not an extensive overview of the disclosure and is not intended to identify key or critical elements or to delineate the scope of protection sought. The following summary merely presents some concepts of the disclosure in a simplified form as an introduction to the more detailed description provided below.

A method of encouraging safe driving of a vehicle using a remote starter device installed at a vehicle is provided. The remote starter device may determine whether it is in signal communication with a remote starter application operating at a mobile computing device separate from the remote starter device. When the remote starter device is in signal communication with the remote starter application, the remote starter device may permit ignition of the vehicle. When the remote starter device is not in signal communication with the remote starter application, the remote starter device may prevent ignition of the vehicle. During operation of the vehicle, one or more communication features at the mobile computing device may be restricted.

Communication features may include text messaging features and phone calling features. Restricting communication features may include preventing access to such communication features at the mobile computing device as well as preventing the mobile computing device from indicating a communication has been received at the mobile computing device. Communications to and from emergency contacts may be permitted during operation of the vehicle. Upon ignition of the vehicle, an ignition confirmation message may be provided, and upon shutoff of the vehicle, a shutoff confirmation message may be provided.

A remote starter device configured to encourage safe driving of a vehicle is also provided. The remote starter device may include an ignition interface configured for connection to an ignition system of the vehicle. The remote starter device may also be configured to automatically initiate vehicle ignition via the ignition interface. The remote starter device may include a communication module configured to exchange communications with a remote starter application operating at a mobile device. The remote starter device may further include a processing module connected to the ignition interface and the communication module.

A memory module of the remote starter device may include instructions executable by a processor of the processing module. When executed, the instructions may cause the remote starter device to determine whether a connection has been established with the remote starter application, permit or prevent vehicle ignition based on whether the connection has been established, and provide an ignition confirmation message upon ignition of the vehicle. Receipt of the ignition confirmation message at the remote starter application may trigger restriction of communication features of the mobile computing device during operation of the vehicle.

A non-transitory computer-readable medium having computer-executable instructions stored thereon that carry out one or more of the steps described above is further provided.

The details of these and other embodiments of the disclosure are set forth in the accompanying drawings and description below. Other features and advantages of aspects of the disclosure will be apparent from the description and drawings.

DESCRIPTION OF THE DRAWINGS

Aspects of the disclosure may be implemented in certain parts, steps, and embodiments that will be described in detail in the following description and illustrated in the accompanying drawings in which like reference numerals indicate similar elements. It will be appreciated with the benefit of this disclosure that the steps illustrated in the accompanying figures may be performed in other than the recited order and that one or more of the steps disclosed may be optional. It will also be appreciated that one or more components illustrated in the accompanying figures may be positioned in other than the disclosed arrangement and that one or more of the components illustrated may be optional.

FIG. 6A is an example of an implementation of a display interface for a remote starter application configured to operate at a mobile computing device.

FIG. 6B is another example of an implementation of a display interface for a remote starter application configured to operate at a mobile computing device.

DETAILED DESCRIPTION

Figure 1A:
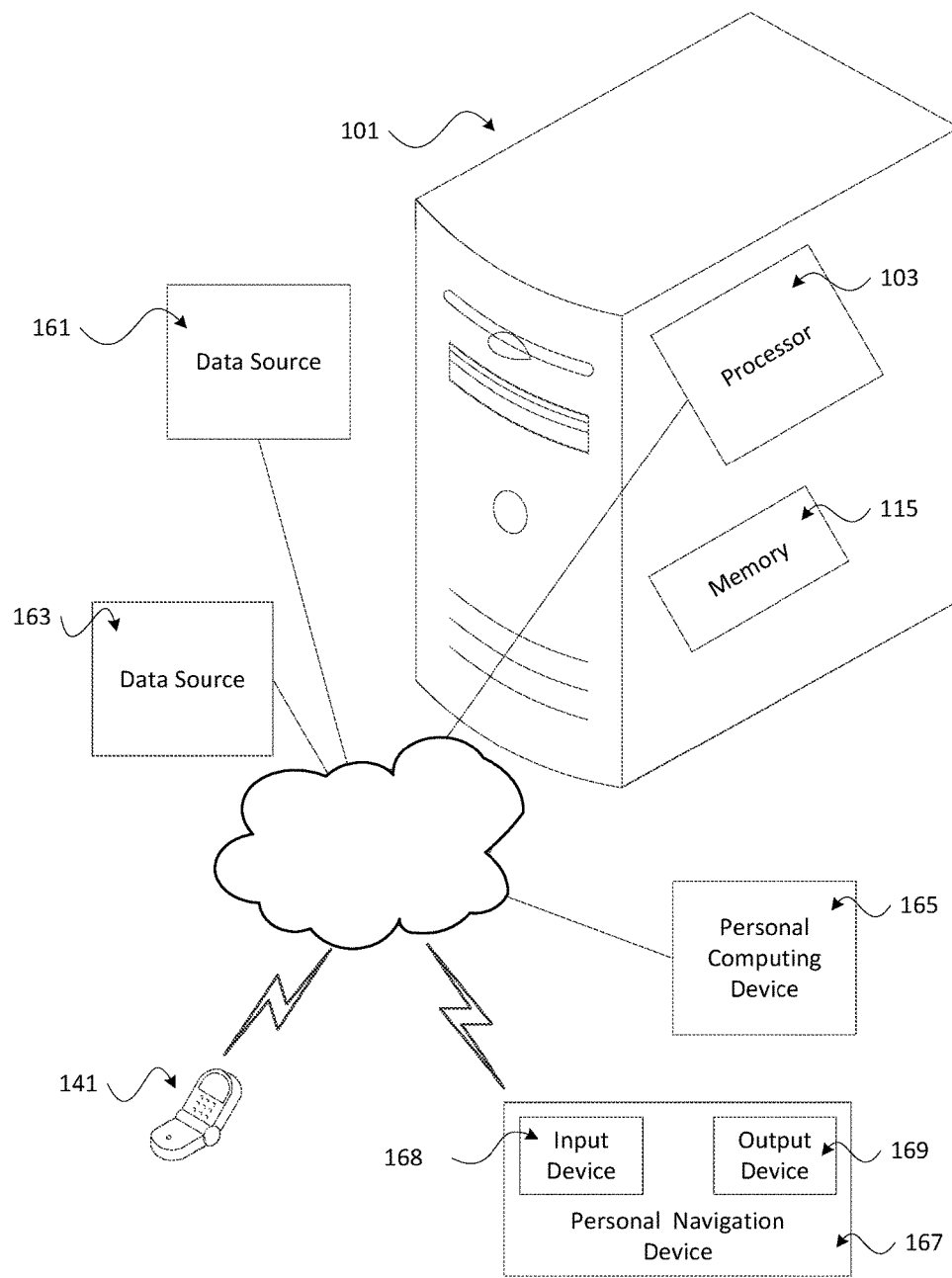
FIG. 1A is an example of an implementation of a suitable operating environment in which various aspects of the disclosure may be implemented.

In accordance with aspects of the present disclosure, systems and methods are disclosed that encourage good driving behavior through the use of a remote vehicle starter device and a remote starter application configured to operate at a mobile computing device. As discussed in further detail below, a remote starter device and a remote starter application may be employed to encourage safe driving behaviors by restricting communications at the mobile computing device during operation of the vehicle. The remote starter device and remote starter application may additionally encourage safe driving behaviors by identifying a driver of the vehicle so as to determine a personalized insurance rate for the driver based on a driving history associated with the driver and observed driving behaviors during operation of the vehicle.

The remote starter application is configured to remotely initiate vehicle ignition by transmitting a signal to the remote starter device via the mobile computing device. The remote starter application is also configured to restrict communications received at or transmitted from the mobile computing device during operation of the vehicle. The remote starter application may be further configured to identify the driver of the vehicle to an insurance underwriting system that determines a personalized insurance rate for the driver. In order to ensure activation of the remote starter application, the remote starter device is configured to prevent ignition of the vehicle when the remote starter application is not operative at the mobile computing device and permit ignition of the vehicle when the remote starter application is operative at the mobile computing device. The remote starter device thus ensures activation of the remote starter application and, as a result, ensures restriction of communications of the mobile computing device during operation of the vehicle.

Because the remote starter device ensures activation of the remote starter application at the mobile computing device, an individual associated with the mobile computing device may be identified as the driver of the vehicle. The identity of the driver (or information that can be used to identify the driver) may be provided to an insurance underwriting system. The insurance underwriting system may thus determine a personalized insurance rate for the driver rather than the conventional approach of determining a general insurance rate for the vehicle. The insurance underwriting system may base the personalized insurance rate on a driving history associated with the driver as well as on observed driving behaviors during an ongoing trip in the vehicle. Personalized insurance rates thus encourage drivers to engage in safe driving behavior in order to obtain better (e.g., relatively less expensive) insurance rates. By identifying the driver of the vehicle, the insurance underwriting system may also be able to provide personalized insurance rates for insurance coverage during individual trips in the vehicle. Insurance coverage provided in this fashion may be described as "pay-as-you-drive" insurance coverage, in which a driver purchases insurance coverage for a single trip. These and other aspects of the disclosure will be discussed in further detail below.

Referring to FIG. 1A, an example of an implementation of a suitable operating environment in which various aspects of the disclosure may be implemented is shown. The operating environment is only one example of a suitable operating environment and is not intended to suggest any limitation as to the scope of use or functionality of the disclosure. The operating environment may be comprised of one or more data sources 161, 163 in communication with a computing device 101. The computing device 101 may use information communicated from the data sources 161, 163 to generate values that may be stored in a database format. In one embodiment, the computing device 101 may be a high-end server computer with one or more processors 103 and one or more memories 115 for storing and maintaining the values generated. The memories 115 storing and maintaining the values generated need not be physically located in the computing device 101. Rather, the memories (e.g., ROM 107, RAM 105, flash memory, hard drive memory, RAID memory, and the like) may be located in a remote data store (e.g., memory storage area 227) physically located outside the computing device 101, but in communication with the computing device 101.

A personal computing device 165 (e.g., a personal computer, tablet PC, handheld computing device, personal digital assistant, mobile device, etc.) may communicate with the computing device 101. Similarly, a geographic positioning device 167 (e.g., a global positioning system (GPS), geographic information system (GIS), satellite navigation system, mobile device, other location tracking device, and the like) may communicate with the computing device 101. The communication between the computing device 101 and the other devices 165, 167 may be through wired or wireless communication networks or direct links. One or more networks may be in the form of a local area network (LAN) that has one or more of the well-known LAN topologies and may use a variety of different protocols, such as Ethernet. One or more of the networks may be in the form of a wide area network (WAN), such as the Internet. The computing device 101 and other devices (e.g., devices 165, 167) may be connected to one or more of the networks via twisted pair wires, coaxial cable, fiber optics, radio waves or other media. The term "network" as used herein and depicted in the drawings should be broadly interpreted to include not only systems in which devices or data sources are coupled together via one or more communication paths, but also stand-alone devices that may be coupled, from time to time, to such systems that have storage capability.

In another embodiment in accordance with aspects of the disclosure, a personal navigation device 167 may operate in a stand-alone manner by locally storing some of the database of values stored in the memories 115 of the computing device 101. For example, a personal navigation device 167 (e.g., a GPS in an automobile) may be comprised of a processor, memory, input devices 168, and output devices 169 (e.g., keypad, display screen, speaker, and the like). The memory may be comprised of a non-volatile memory that stores a database of values. Therefore, the personal navigation device 167 need not communicate, in one example, with a computing device 101 located at a remote location. Rather, the personal navigation device 167 may behave in a stand-alone manner and use its processor to perform particular steps disclosed herein. If desired, the personal navigation device 167 may be refreshed with an updated database of values after a period of time.

In yet another embodiment in accordance with aspects of the disclosure, a personal computing device 165 may operate in a stand-alone manner by locally storing some of the database of values stored in the memory of the computing device. For example, a personal computing device 165 may be comprised of a processor, memory, input device (e.g., keypad, CD-ROM drive, DVD drive, etc.), and output device (e.g., display screen, printer, speaker, etc.). The memory may be comprised of CD-ROM media. Therefore, the personal computing device 165 may use the input device to read the contents of the CD-ROM media. Rather, the personal computing device 165 may behave in a stand-alone manner and use its processor to perform particular steps disclosed herein. If desired, the personal computing device may be provided with an updated database of values (e.g., in the form of updated CD-ROM media) after a period of time.

The data sources 161, 163 may provide information to the computing device 101. In one embodiment in accordance with aspects of the disclosure, a data source may be a computer which contains memory storing data and is configured to provide information to the computing device 101. Some examples of providers of data sources in accordance with aspects of the disclosure include, but are not limited to, insurance companies, third-party insurance data providers, government entities, state highway patrol departments, local law enforcement agencies, state departments of transportation, federal transportation agencies, traffic information services, road hazard information sources, construction information sources, weather information services, geographic information services, vehicle manufacturers, vehicle safety organizations, and environmental information services. For privacy protection reasons, in some embodiments of the disclosure, access to the information in the data sources 161, 163 may be restricted to only authorized computing devices 101 and for only permissible purposes. For example, access to the data sources may be restricted to only those persons or entities that have signed an agreement (e.g., an electronic agreement) acknowledging their responsibilities with regard to the use and security to be accorded this information.

The computing device 101 may use the information from the data sources 161, 163 to generate values that may be used to determine personalized insurance rates for drivers. Some examples of the information that the data sources may provide to the computing device 101 include, but are not limited to, accident information, geographic information, and other types of information useful to determine insurance rates.

Figure 1B:
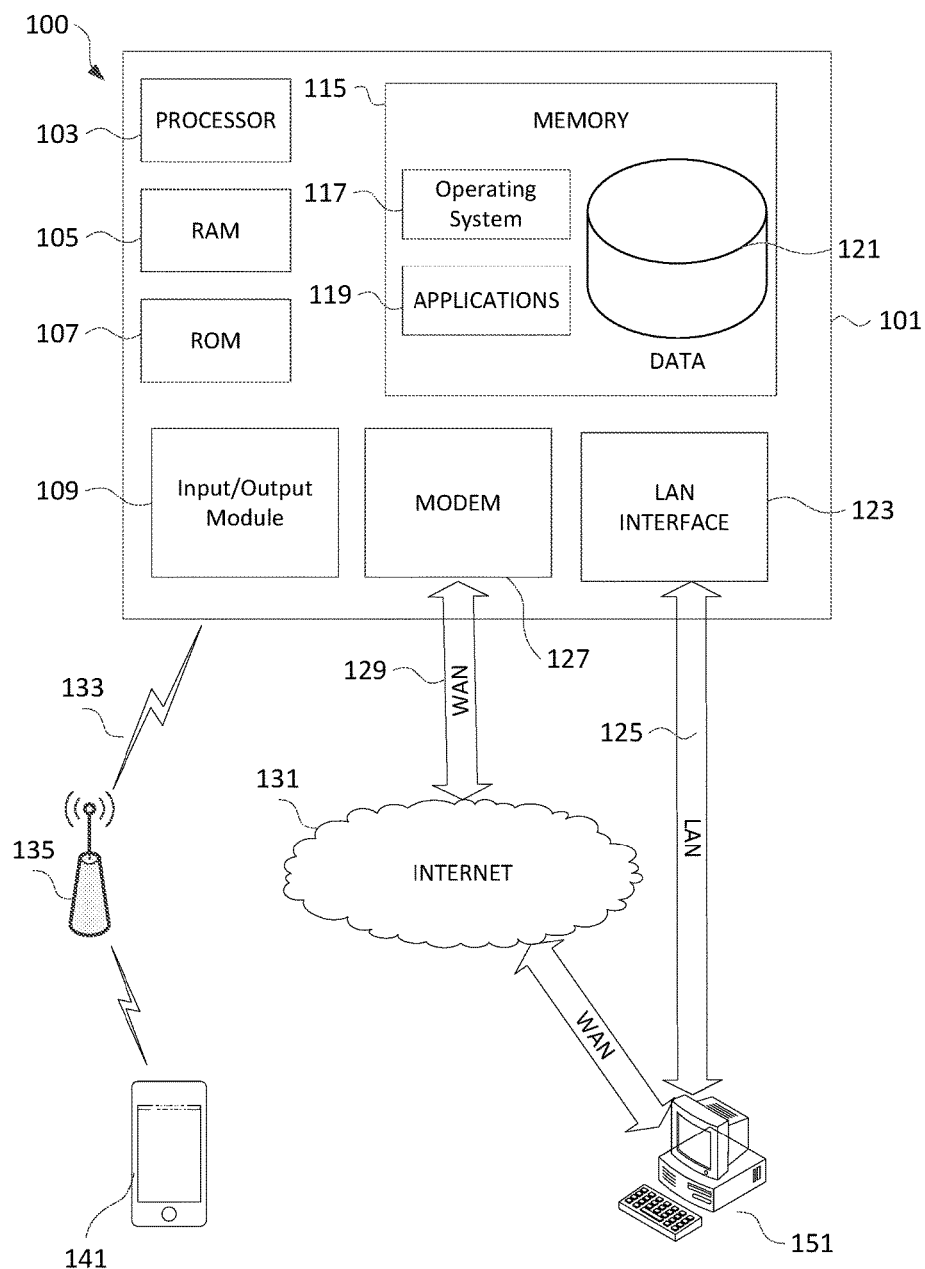
FIG. 1B is a block diagram of a system that may be used according to one or more example embodiments of the disclosure.

FIG. 1B illustrates a block diagram of a computing device (or system) 101 in the communication system 100 that may be used according to one or more illustrative embodiments of the disclosure. The device 101 may have a processor 103 for controlling overall operation of the device 101 and its associated components, including RAM 105, ROM 107, input/output (I/O) module 109, and memory 115. The computing device 101, along with one or more additional devices (e.g., terminals 141, 151) may correspond to any of multiple systems or devices, such as an insurance underwriting system (FIG. 2), configured as described herein for determining personalized insurance rates.

I/O module 109 may include a microphone, keypad, touch screen, and/or stylus through which a user of the computing device 101 may provide input, and may also include one or more of a speaker for providing audio output and a video display device for providing textual, audiovisual or graphical output. Software may be stored within memory 115 or storage to provide instructions to processor 103 for enabling device 101 to perform various functions. For example, memory 115 may store software used by the device 101, such as an operating system 117, application programs 119, and an associated internal database 121. Processor 103 and its associated components may allow the insurance underwriting system to execute a series of computer-readable instructions to, e.g., identify a driver of a vehicle, receive driving information from the vehicle, and determine a personalized insurance rate.

The insurance underwriting system may operate in a networked environment supporting connections to one or more remote computers, such as terminals 141 and 151. The terminals 141 and 151 may be personal computers, servers (e.g., web servers, database servers), or mobile communication devices (e.g., vehicle telematics devices, on-board vehicle computers, mobile phones, portable computing devices, and the like), and may include some or all of the elements described above with respect to the driving analysis system 101. The network connections may include a local area network (LAN) 125 and a wide area network (WAN) 129, and a wireless telecommunications network 133, but may also include other networks. When used in a LAN networking environment, the insurance underwriting system may be connected to the LAN 125 through a network interface or adapter 123. When used in a WAN networking environment, the system 101 may include a modem 127 or other means for establishing communications over the WAN 129, such as network 131 (e.g., the Internet). When used in a wireless telecommunications network 133, the system 101 may include one or more transceivers, digital signal processors, and additional circuitry and software for communicating with wireless computing devices 141 (e.g., mobile phones, vehicle telematics devices) via one or more network devices 135 (e.g., base transceiver stations) in the wireless network 133.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices and driving analysis system components described herein may be configured to communicate using any of these network protocols or technologies.

Additionally, one or more application programs 119 used by the insurance underwriting system may include computer executable instructions (e.g., driving analysis programs) for receiving and storing vehicle driving data, analyzing the driving data to assess driving behaviors, determining a personalized insurance rate for a driver, and performing other related functions as described herein.

System Overview

Figure 2:
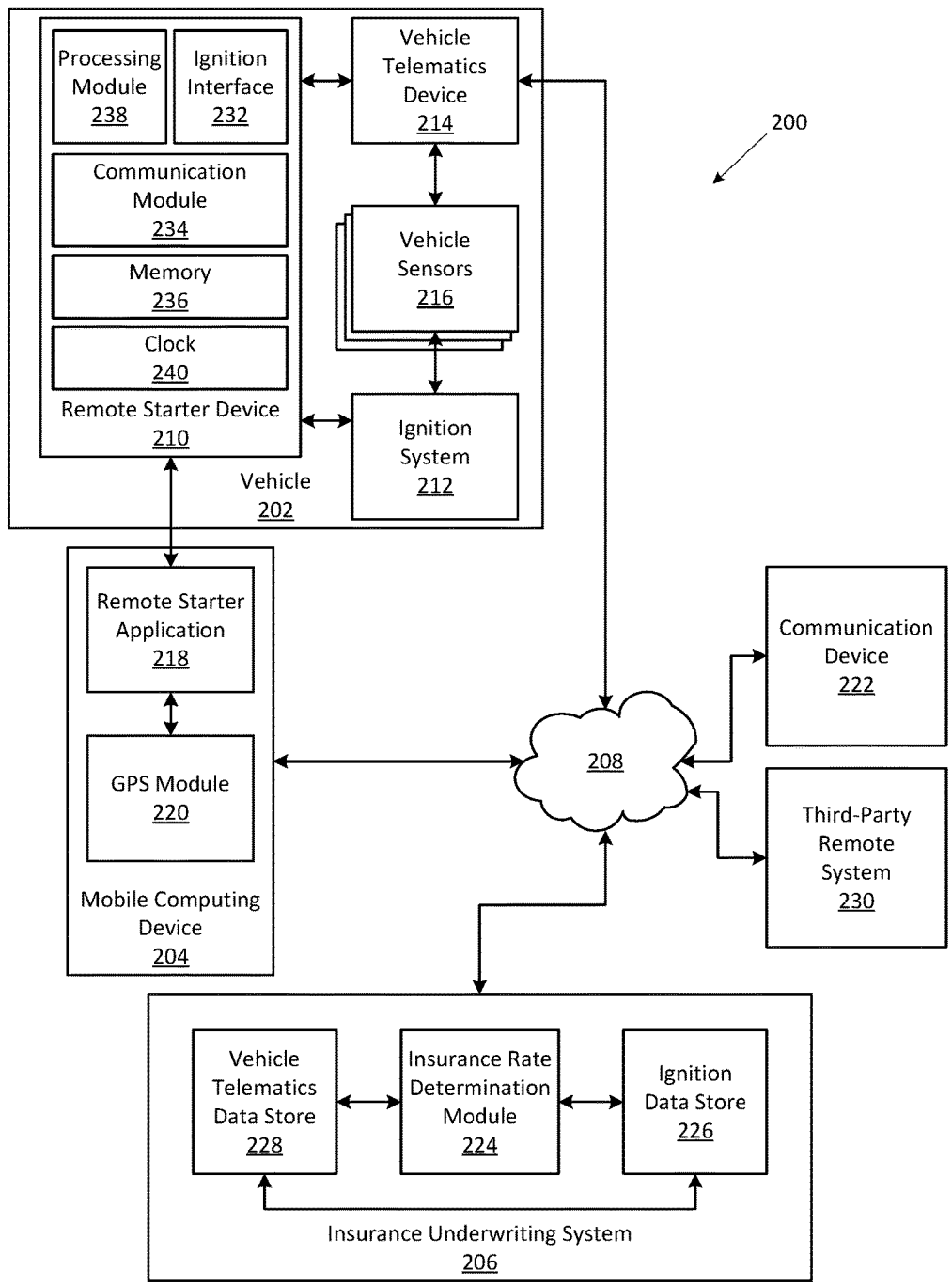
FIG. 2 is a block diagram of an example of an implementation of system for encouraging safe driving behavior using a remote starter device installed at a vehicle.

FIG. 2 is a block diagram of an example of an implementation of system 200 for encouraging safe driving behavior. One or more of the components shown in FIG. 2 may be implemented in hardware, software, or a combination of hardware and software. Additionally, one or more of the components of the system 200 may include a computing device or system having some or all of the structural components described above for computing device 101.

As seen in FIG. 2, various components of a vehicle 202, mobile computing device 204, and insurance underwriting system 206 may be in signal communication with each other via a network 208. The vehicle 202 may include a remote starter device 210 configured for connection to an ignition system 212 and a vehicle telematics device 214 configured for connection to one or more vehicle sensors 216. The mobile computing device 204 may include a remote starter application 218 and a GPS module 220 connected to the remote starter application. The remote starter application 218, when operative at the mobile computing device 204, may restrict communications received at or transmitted from the mobile computing device during operation of the vehicle 202. The remote starter application 218 may also facilitate identification of the driver of the vehicle 202. The mobile computing device 204 may be configured to exchange communications with a communication device 222 (e.g., another mobile telephone) via the network 208. The insurance underwriting system 206 may include an insurance rate determination module 224, an ignition data store 226, and a vehicle telematics data store 228. The insurance underwriting system 206 may also be configured to exchange communications with a remote third-party system 230 via the network 208. An insurance provider may operate the insurance underwriting system 206 and may provide (or otherwise make accessible) the remote starter device 210 and remote starter application 218 to insurance customers.

The remote starter device 210 may be a device configured to initiate ignition of the vehicle 202 without a standard ignition key. The remote starter device 210, in this example, includes an ignition interface 232 configured for connection to the ignition system 212 of the vehicle 202, a communication module 234 for receiving remote ignition requests, a memory module 236 for storing computer-executable instructions related to remote vehicle ignition, and a processing module 238 connected to the ignition interface 232, communication module 234, and memory module 236. The ignition interface 232 may, for example, connect to an ignition switch, ignition wire, power wire, starter wire, brake wire, tachometer wire, and brake wire of the ignition system 212 in order initiate vehicle ignition. The processing module 238 may include one or more processors that control operation of the ignition interface 232 and communication module 234 based on the instructions retrieved from the memory module 236. The remote starter device 210 may also include a timing device 240, e.g., a clock for providing date and time information.

The communication module 234 is configured to receive ignition requests, e.g., an ignition request signal, from a remote device. For example, the communication module 234 may receive an ignition request from the remote starter application 218 via the mobile computing device 204. The communication module 234 may forward the ignition request to the processing module 238, and in response, the processing module 238 may retrieve and execute the computer-executable instructions stored at the memory module 236 to initiate vehicle ignition. The communication module 234 may also be configured to transmit communications from the remote starter device 210, e.g., ignition confirmation messages indicating that vehicle ignition was successfully achieved as well as ignition status messages indicating whether the vehicle 202 is presently running or presently shut off. The remote starter device 210 may also be in signal communication with the vehicle telematics device 214 to assess the present status of the vehicle 202. The communication module 234 may receive and transmit communications via a wired or wireless signals over a WAN such as the Internet or directly via a personal area network (PAN) using various communication technologies (e.g., Bluetooth, USB, and the like).

The remote starter device 210 is configured such that vehicle ignition may be achieved via the remote starter application 218. In this regard, the remote starter application 218 may be viewed as a replacement for a standard ignition key. If the remote starter device 210 is not in signal communication with the remote starter application 218, then the remote starter device may determine the remote starter application is not operating at the mobile computing device 204 and prevent ignition of the vehicle 202, e.g., by blocking or failing to provide one or more signals to the ignition system 212. If the remote starter device 210 is in signal communication with the remote starter application 218, then the remote starter device may determine that the remote starter application is operating at the mobile computing device 204 and permit ignition of the vehicle 202, e.g., in response to a remote ignition request. In this way the remote starter device 210 ensures that the driver launches the remote starter application 218 before operating the vehicle 202.

The remote starter device 210 may also be configured to establish communications with the remote starter application 218. The remote starter device 210 may establish a communication channel with the remote starter application 218 via conventional handshaking techniques. In some example embodiments, the remote starter device 210 and remote starter application 218 may maintain the connection during operation of the vehicle 202 by exchanging periodic communications. In other example embodiments, the remote starter device 210 and remote starter application 218 may only communicate in response to events occurring at the vehicle 202 or at the mobile computing device 204, e.g., in response to receipt of an ignition request provided by the remote starter application 218 or in response to a shutdown of the vehicle.

The vehicle 202 may also include a vehicle telematics device 214 that monitors the status of the vehicle during operation of the vehicle. The vehicle telematics device 214 may be in signal communication with the insurance underwriting system 206 to provide driving information to the insurance underwriting system. The vehicle telematics device 214 may provide the driving information in the form of vehicle telematics data. The vehicle telematics device 214 may be a type of on-board data recording device (e.g., an on-board diagnostic device operating according to the OBDII standard) that is configured to communicate with one or more vehicle sensors 216. The vehicle telematics device 214 may also include a communication module 234 (not shown) configured to communicate with the insurance underwriting system 206 via the network 208.

The vehicle sensors 216 may be capable of detecting and recording various conditions at the vehicle 202 and operational parameters of the vehicle. Vehicle sensors 216 may, for example, detect and store data corresponding to the speed, distance driven, rate of acceleration or deceleration (e.g., braking), and geographic location of the vehicle 202. Vehicle sensors 216 may also, for example, detect and store data corresponding to specific instances of sudden acceleration, deceleration, and swerving of the vehicle 202. Vehicle sensors 216 may further detect and store data received from the internal systems of the vehicle 202 such as, for example, impact to the body of the vehicle, air bag deployment, headlight usage, brake light operation, door opening and closing, door locking and unlocking, cruise control usage, hazard light usage, windshield wiper usage, horn usage, turn signal usage, seat belt usage, radio usage within the vehicle, maintenance performed on the vehicle, and other data collected by the vehicle systems.

Additional vehicle sensors 216 may detect and store the external driving conditions such as, for example, external temperature, rain (e.g., using a rain sensor on a windshield), light levels, and sun position for driver visibility. The vehicle sensors 216 may additionally detect and store data relating to moving violations and the observance of traffic signals and traffic signs near the vehicle 202. Furthermore, internal cameras in the vehicle sensors 216 may detect conditions such as the number of the passengers in the vehicle and potential sources of driver distraction within the vehicle 202 (e.g., pets, phone usage, unsecured objects, and the like). Vehicle sensors 216 may also include external cameras or proximity sensors that detect other nearby vehicles, traffic levels, road conditions, traffic obstructions, animals, cyclists, pedestrians, and other conditions that may factor into a driving analysis. Vehicle sensors 216 may also detect and store data relating to the maintenance of the vehicle 202, such as the engine status, oil level, engine coolant temperature, odometer reading, the fuel level, engine revolutions per minute (RPMs), or tire pressure. It will be recognized that a variety of other vehicle sensors 216 may be additionally or alternatively employed in accordance with various aspects of this disclosure.

The vehicle telematics device 214 may be in signal communication with systems located remotely relative to the vehicle telematics device (e.g., a remote third-party system 230) and capable of determining additional conditions inside or outside of the vehicle 202. In this regard, a remote third-party system 230 may act as a vehicle sensor in accordance with aspects of this disclosure. As an example, one of the remote-third party systems may be a weather information system. A vehicle sensor 216 may be communicatively coupled with the weather information system to receive weather information that the vehicle sensor 216 may use to determine the weather conditions in which the vehicle 202 is being operated (e.g., rain, snow, sleet, hail, temperature, wind, road conditions, visibility, etc.) The vehicle telematics device 214 may also include, for example, a GPS module 220 that provides the location (e.g., GPS coordinates) of the vehicle 202 to the remote third-party computer system, and the weather information system may retrieve weather information from a database or other data store based on the geographic location of the vehicle. The weather information system may thus use the geographic location information of the vehicle 202 to determine the weather conditions (e.g., snow characteristic, hail characteristic, etc.) where the vehicle is presently located. In some examples, the remote third-party system 230 may immediately transmit the information to the vehicle telematics device 214. In other example implementations, the remote third-party system 230 may transmit the information only if the information has changed within a predetermined time period following a previous request. It will be appreciates with the benefit of this disclosure that, although the preceding example discusses weather characteristics, various other types of characteristics may use a similar arrangement to monitor driving conditions and driving behavior (e.g., location characteristics, road rules characteristics, and the like).

The vehicle sensors 216 may store data within the vehicle 202 (e.g., at the vehicle telematics device 214) or, additionally or alternatively, may transmit the data to one or more external computer systems, e.g., an insurance underwriting system 206. As shown in FIG. 2, the vehicle sensors 216 may be configured to transmit data to one or more external computer systems via a vehicle telematics device 214. In other examples, one or more of the vehicle sensors 216 may be configured to transmit data directly without using a vehicle telematics device 214. The vehicle telematics device 214 may, for example, be configured to receive and transmit data from some of the vehicle sensors 216, while other vehicle sensors may be configured to directly transmit data to one or more external computer systems without using the vehicle telematics device 214. Thus, the vehicle telematics device 214 may be optional in certain embodiments where one or more vehicle sensors 216 are configured to independently capture, store, and transmit vehicle operation and driving data.

The vehicle telematics device 214 may be a computing device containing many or all of the hardware or software components as the computing device 101 (FIG. 1A). As discussed above, the vehicle telematics device 214 may receive vehicle operation and driving data from one or more vehicle sensors 216 and may transmit the data to one or more external computer systems via the network 208. The vehicle telematics device 214 may also be configured to detect or determine additional types of data relating to real-time driving and the condition of the vehicle 202. In certain embodiments, the vehicle telematics device 214 may contain or may be integral with one or more of the vehicle sensors 216 discussed herein.

Additionally, the vehicle telematics device 214 may utilize the vehicle sensors 216 to collect data regarding the number of passengers and the types of passengers (e.g. adults, children, teenagers, pets, and the like) in the vehicle 202. The telematics device may also be configured to collect data regarding movement of the driver or the condition of the driver. The vehicle telematics device 214 may, for example, include or communicate with vehicle sensors 216 that monitor driver movements, such as the eye position, head position, and other positions of the driver. Additionally, the vehicle telematics device 214 may collect data regarding the physical or mental state of the driver, such as fatigue or intoxication. The condition of the driver may be determined through the movements of the driver or through vehicle sensors 216, for example, sensors that detect the content of alcohol in the air or blood alcohol content of the driver, such as a breathalyzer with an ethanol vapor (EtOH) sensor.

The vehicle telematics device 214 may also utilize the vehicle sensors 216 to collect information regarding route choice, whether the driver follows a given route, and to classify the type of trip (e.g. commute, errand, new route, and the like). In certain embodiments, the vehicle telematics device 214 may be configured to communicate with the vehicle sensors 216 to determine when and how often the vehicle 202 stays in a single lane or strays into other lanes. To determine the chosen route, lane position, and other data, the vehicle telematics device 214 may include or may receive data from a mobile telephone, a GPS device, locational sensors positioned inside the vehicle 202, or locational sensors or devices located remotely relative to the vehicle.

The vehicle telematics device 214 may also store the vehicle information that identifies the vehicle type, e.g., the make, model, trim (or sub-model), year, or engine specifications. The vehicle type may be programmed into the vehicle telematics device 214 by a user or customer, determined by accessing a remote computer system, such as an insurance company or financial institution system, or may be determined from the vehicle 202 itself, e.g., by accessing the computer systems of the vehicle.

The mobile computing device 204 may also be referred to as a mobile device and may include some or all of the components described above for computing device 101. The mobile computing device 204 may be configured to transmit and receive wireless communications such that a user may wirelessly communicate with other communication devices directly or via one or more networks. Mobile computing devices may include, for example, laptop computers, tablet computers, handheld/palmtop computers, handheld game consoles, personal navigation devices, mobile telephones, and other devices configured for mobile wireless communication. A data store of the mobile computing device 204 may store a remote starter application 218 configured to operate at the mobile computing device. The remote starter application 218 may include computer-executable instructions that, when executed by a processor of the mobile device 204, cause the processor to perform one or more of the steps described in further detail below. Such steps may include, for example, communicating with a remote starter device 210 installed at a vehicle 202 to remotely initiate vehicle ignition and activating restrictions on communication features at the mobile computing device 204 during operation of the vehicle.

As noted above, the remote starter application 218 may reside at a data store of the mobile computing device 204 and include instructions executable by a processor of the mobile computing device. The remote starter application 218 may be configured to perform a variety of tasks at the mobile computing device 204. Such tasks may include, for example: remotely initiating vehicle ignition via a remote starter device 210 installed at the vehicle 202; restricting communication features at the mobile computing device 204 during operation of the vehicle; communicating with the remote starter device 210 during operation of the vehicle; communication with an insurance underwriting system 206 during operation of the vehicle; facilitating insurance coverage transactions; and providing driving behavior summaries based on observed driving behaviors during operation of the vehicle. These tasks will be discussed in further detail below.

The insurance underwriting system 206 may be a computing device separate from the vehicle 202, containing some or all of the hardware or software components as the computing device 101 (FIG. 1B). The insurance underwriting system 206 may include an insurance rate determination module 224 configured to determine insurance rates, e.g., personalized insurance rates for drivers. The insurance rate determination module 224 may be configured to determine personalized insurance rates based, at least in part, on a driving history associated with a driver (e.g., past driving behaviors) as well as driving behaviors observed during present operation of the vehicle 202 (e.g., current/real-time driving behaviors). Accordingly, the insurance underwriting system 206 may also include a vehicle telematics data store 228 that stores vehicle telematics data received from a vehicle telematics device 214 installed at the vehicle 202 as well as an ignition data store 226 that stores information corresponding to instances when a driver operates the vehicle.

The insurance underwriting system 206 may be implemented as a single system (e.g., a single computer server) or may be separate systems (e.g. multiple computer servers). In some examples, the insurance underwriting system 206 may be a central server configured to receive vehicle telematics data from a plurality of remotely located mobile devices 204 and vehicle telematics devices 214. Additionally, the insurance rate determination module 224 may be implemented in hardware, software, or a combination of hardware and software that is configured to perform a set of specific functions within the insurance underwriting system 206, e.g., receive and store vehicle telematics information, receive and store remote ignition information, and determine personalized insurance rates for drivers. These functions may be executed by one or more software applications running on generic or specialized hardware within the insurance underwriting system 206. The insurance rate determination module 224 may utilize the vehicle telematics data received from the vehicle telematics device 214 as well as information from other systems (e.g., a remote third-party system 230) to perform driving analyses when determining a personalized insurance rate for the driver.

The vehicle telematics data store 228 may be, for example, a vehicle telematics database configured to store the vehicle telematics data received from the vehicle telematics device 214 installed at the vehicle. A vehicle telematics database may implement a vehicle telematics data model as a set of database tables and columns relating to vehicle telematics information. The vehicle telematics data model may define various entities, attributes, and relationships corresponding to vehicle telematics data received from the vehicle 202. A database management system (DBMS) may manage the tasks of creating, modifying, and retrieving vehicle telematics records from the vehicle telematics database. The vehicle telematics database may also relate vehicle telematics data driver information associated with vehicle drivers.

The ignition data store 226 may be, for example, an ignition database configured to store information relating to ignition of the vehicle 202. As discussed further below, an ignition record database may implement an ignition record data model as a set of database tables and columns relating to vehicle ignition using the remote starter application 218 and remote starter device 210. The ignition record data model may define various entities, attributes, and relationships corresponding to vehicle ignition information. A DBMS may also manage the tasks of creating, modifying, and retrieving ignition records from the ignition database. The ignition records in the ignition data store 226 may be respectively associated with vehicle telematics records in the vehicle telematics data store 228. In this way, past and present driving behaviors may be associated with instances of remote vehicle ignition, e.g., individual trips in the vehicle 202.

The insurance rate determination module 224 may be configured to determine or otherwise calculate an insurance rate, e.g., a personalized insurance rate for a driver of the vehicle 202. An insurance rate calculated for the driver rather than for the vehicle 202 may be referred to as a personalized insurance rate. The insurance rate determination module 224 may determine the personalized insurance rate based, at least in part, on past or present vehicle telematics data associated with the driver. Past vehicle telematics data associated with the driver may have been collected during previous trips taken by the driver in one or more vehicles and therefore represent a driving history for the driver. Present vehicle telematics data associated with the driver may be collected in real-time (or near real-time) as the driver operates the vehicle 202.

It will be appreciated that underwriting insurance policies may be an actuarial endeavor for which many techniques and approaches are presently known. The insurance rate determination module 224, in this example, may be configured to employ these known techniques and approaches when determining personalized insurance rates.

The insurance rate determination module 224, in this example, may analyze the vehicle telematics data to determine the personalized insurance rate. Based on the vehicle telematics data (e.g., speed, acceleration/deceleration, turning, and so forth), the insurance rate determination module 224 may identify various "safe" or "unsafe" driving behaviors the driver has engaged in during present or past operation of the vehicle 202. Driving behaviors may correspond to various driving characteristics the insurance underwriting system 206 may employ when determining a personalized insurance rate for a driver. Generally, a characteristic may be anything that can be detected and measured in the tangible world, sometimes with the use of sensory circuitry (e.g., sensors 212, 214). It will be appreciated that various characteristics are contemplated herein and will become apparent to a person having ordinary skill in the art with the benefit of this disclosure.

Driving characteristics may include information relating to braking, acceleration, speed, steering, lane changes, lateral movement, distance traveled, duration of travel, tailgating, and other characteristics. Information relating to braking, acceleration, steering, lateral movement, and other characteristics may be measured in units of force (or magnitude of force). In some examples, braking and acceleration information may be conflated into a single characteristic in which a negative value indicates braking and a positive value indicates acceleration. Information relating to speed and other characteristics may be measured in units of distance over time, such as miles per hour. Information relating to the distance traveled may be measured in units of distance, such as miles. Information relating to duration of travel may be measured in units of time, such as minutes, e.g., a measurement of the total number of minutes a driver has operated the vehicle 202, from the moment the engine started until it is shutdown (e.g., the engine ignition is switched off). Information relating to lane changes, tailgating, and other characteristics may be measured as Boolean values and/or numerical values. For example, information relating to a lane change may measure the riskiness of the lane change, taking into account the speed of the vehicle 202, the severity of the braking of the vehicle, and the severity of the steering of the vehicle. Information relating to tailgating may measure the proximity of the vehicle 202 to another vehicle, taking into account the speed of the vehicle. In one example, a tailgate measurement may be a Boolean value, set to true if a predetermined threshold is exceeded with respect to a safe following distance while the vehicle 202 is moving above a particular speed. Generally, many of the driving characteristics corresponding to driving behavior may be detected and measured with the use of the vehicle telematics device 214 or comparable devices. For example, values for driving characteristics may be retrieved via an on-board diagnostics (OBDII) interface (not shown) in the vehicle 202. In another example values for driving characteristics may be retrieved with the use of an accelerometer, gyroscope, proximity sensors, and/or digital compass in a device installed in or on the vehicle 202. The insurance underwriting system 206 may thus identify various driving behaviors as safe or unsafe.

The insurance underwriting system 206 may employ other driving characteristics when determining a personalized insurance rate for the driver. In this regard, the personalized insurance rate for the driver may be based on a combination of past or present driving behaviors as well as other characteristics. Other characteristics may include, for example, vehicle characteristics, driver characteristics, location characteristics, time characteristics, weather characteristics, traffic characteristics, road rules characteristics, and other characteristics. Vehicle characteristics may include, for example, engine temperature, tire pressure, environmental features, and other characteristics. Engine temperature may be measured in units of degree, such as Fahrenheit. Tire pressure may be measured in units of force per area, such as Pascal. Environmental features may be measured as a numerical value indicating the degree to which the operation is environmentally friendly (e.g., driving within particular speed ranges may be more conducive to maximum gas mileage and earn a higher environmental rating). Vehicle characteristics may relate to the run-time, dynamic condition of the vehicle and may be detected and measured with the use of sensory circuitry installed in the vehicle 202 or in a vehicle telematics device 214, through an OBDII interface, or through an external server.

Driver characteristics may include, for example, fatigue, intoxication, seat belt usage, information relating to passengers in the vehicle 202, music or noise, and other characteristics. Fatigue may be measured with the use of a sensor that measures the blink rate of the driver, and may be provided as a numerical value. Intoxication may be measured using an EtOH sensor (or other device that measures ethanol vapor or blood ethanol levels) and may be provided as a numerical value. Seat belt usage may be measured as a Boolean, e.g., TRUE if the driver seat belt is engaged and FALSE if the driver seat belt is unbuckled. Information relating to passengers in the vehicle 202 may be a measure of the number of passengers, and may be measured using infrared or laser technology (e.g., the Kinect™ system), or another technology. Music or noise may be a measure of the amount of sound in the vehicle 202, and may be measured in decibels using a microphone, e.g., a microphone installed in a smartphone or the vehicle itself. Driver characteristics may be detected and measured with the use of sensors located within the vehicle 202 and may relate to the capacity of the driver to safely operate the vehicle.

Weather characteristics may include, for example, rain, snow, or hail information; visibility information (e.g., sunny, cloudy, foggy); wind speed, temperature, and other weather characteristics. The insurance underwriting module may query a third-party remote system via a network 208 for information relating to such weather characteristics (e.g., a weather information server). Time characteristics may include, for example, the time of day, the day of the week, the day of the month, daylight, nighttime, or other time characteristics. Time characteristics may be provided by, e.g., the remote starter application 218, the mobile computing device 204, the vehicle telematics device 214, the insurance rate determination module 224, the insurance underwriting system 206, or other sources. Traffic characteristics may include, for example, traffic congestion, vehicle type, and other traffic characteristics. Road rules characteristics may include, for example, speed limit information, traffic signal information (e.g., stop signs, traffic lights), and other road rules characteristics. These characteristics may be measured or determined using sensors 214, or additionally or alternatively, using sensors 212.

Location characteristics may include, for example, geographic location (e.g., GPS coordinates), road surface information (e.g., parking lot, alley, highway, off-road, surface street), zip code, region (e.g., city, suburb, rural), or other location characteristics. Other examples of location characteristics may include characteristics relating to areas under construction, topography (e.g., flat, rolling hills, steep hills, curves), road type (e.g., residential, interstate, separated highway, city street, country road), road feature (e.g., intersection, gentle curve, blind curve, bridge, tunnel), intersections, roundabouts, railroad crossings, passing zones, merge point, the number of lanes, the width of the road or lanes, population density within a predetermined vicinity (e.g., within a radius, within a zip code), condition of the road (e.g., new, worn, severely damaged with sink-holes, severely damaged with erosion, gravel, dirt, paved), wildlife area, state, county, or municipality. The aforementioned characteristics may be measured/determined using sensor units 214, or alternatively, in some scenarios, using sensor units 212. The insurance underwriting system 206 may, for example, query one or more third-party remote systems via the network 208 to obtain information relating to these or other location characteristics.

The insurance underwriting system 206 may be part of a backend system of an insurance provider (e.g., a vehicle insurance provider). The insurance rate determination module 224 may analyze the collected driving information and other information to determine a personalized insurance rate for the driver. The insurance rate determination module 224 may use machine learning or other techniques, such as artificial intelligence, statistical or predictive modeling, or other methods, to analyze the data. In one example, the insurance rate determination module 224 may limit the analysis to the past and present vehicle telematics data associated with the driver. In such an example, the insurance rate determination module 224 may access the vehicle telematics database storing the collected vehicle telematics data associated with the driver. The insurance rate determination module 224 may analyze some or all of the vehicle telematics data associated with the driver to determine a predictive model that identifies an insurance risk for the driver. In this regard, the insurance rate determination module 224 identifies driving behaviors that contribute to a lower or higher personalized insurance rate. As noted above, the insurance rate determination module 224 may analyze other types of characteristics to identify an insurance risk for the driver and determine a corresponding personalized insurance rate.

It will further be appreciated that the insurance risk and personalized insurance rate for the driver may be further based on such characteristics associated with other drivers, e.g., the historical driving behaviors of other drivers within the vicinity of the area in which the driver will operate the vehicle 202. For example, the insurance rate determination module 224 may query a remote third-party system 230 via the network 208 (e.g., accident report databases, crime report databases) when determining the risk profile of other drivers within the vicinity of the driver. For example, statistical data may indicate that certain locations are more dangerous or less dangerous at certain times throughout the day. A hypothetical location may be located, for example, on a steep cliff-side with no street lights, such that once the sun begins to set in the evening. Accordingly, the statistical data may show that the riskiness of driving through this hypothetical location may increase until the sun has set. As a result, the insurance rate determination module 224 may include time of day characteristics location characteristics identifying the hypothetical location (e.g., via a zip code). If the vehicle telematics data indicates that the driver typically travels or is travelling through this hypothetical location during these risky periods, then the insurance rate determination module 224 may determine a relatively higher personalized rate for the driver.

For example, the insurance rate determination module 224 may query a remote third-party system 230 via the network 208 (e.g., accident report databases, crime report databases) when determining the risk profile of other drivers within the vicinity of the driver. For example, statistical data may indicate that certain locations are more dangerous or less dangerous at certain times throughout the day. A hypothetical location may be located, for example, on a steep cliff-side with no street lights, such that once the sun begins to set in the evening. Accordingly, the statistical data may show that the riskiness of driving through this hypothetical location may increase until the sun has set. As a result, the insurance rate determination module 224 may include time of day characteristics location characteristics identifying the hypothetical location (e.g., via a zip code). If the vehicle telematics data indicates that the driver typically travels or is travelling through this hypothetical location during these risky periods, then the insurance rate determination module 224 may determine a relatively higher personalized rate for the driver. As another example, the historical vehicle telematics data for the driver may indicate that the driver typically travels through heavily-congested metropolitan areas in a downtown area of a city. Accordingly, the insurance rate determination module 224 may determine a relatively higher personalized insurance rate for the driver based partly on the risk profile for this location.

The insurance rate determination module 224 may consider these characteristics when determining the personalized insurance rate for the driver. As an example, the insurance rate determination module 224 may assign a risk profile to the driver based on these characteristics, and determine the personalized insurance rate based on the risk profile associated with the driver. Approaches to determining an insurance rate may be described in U.S. Pat. Nos. 7,937,278 and 8,280,752 to Cripe et al. as well as U.S. Pat. Nos. 8,065,169 and 8,249,968 to Oldham et al. each assigned to Allstate Insurance Company of Northbrook, Ill.

Process Overview

Figure 3:
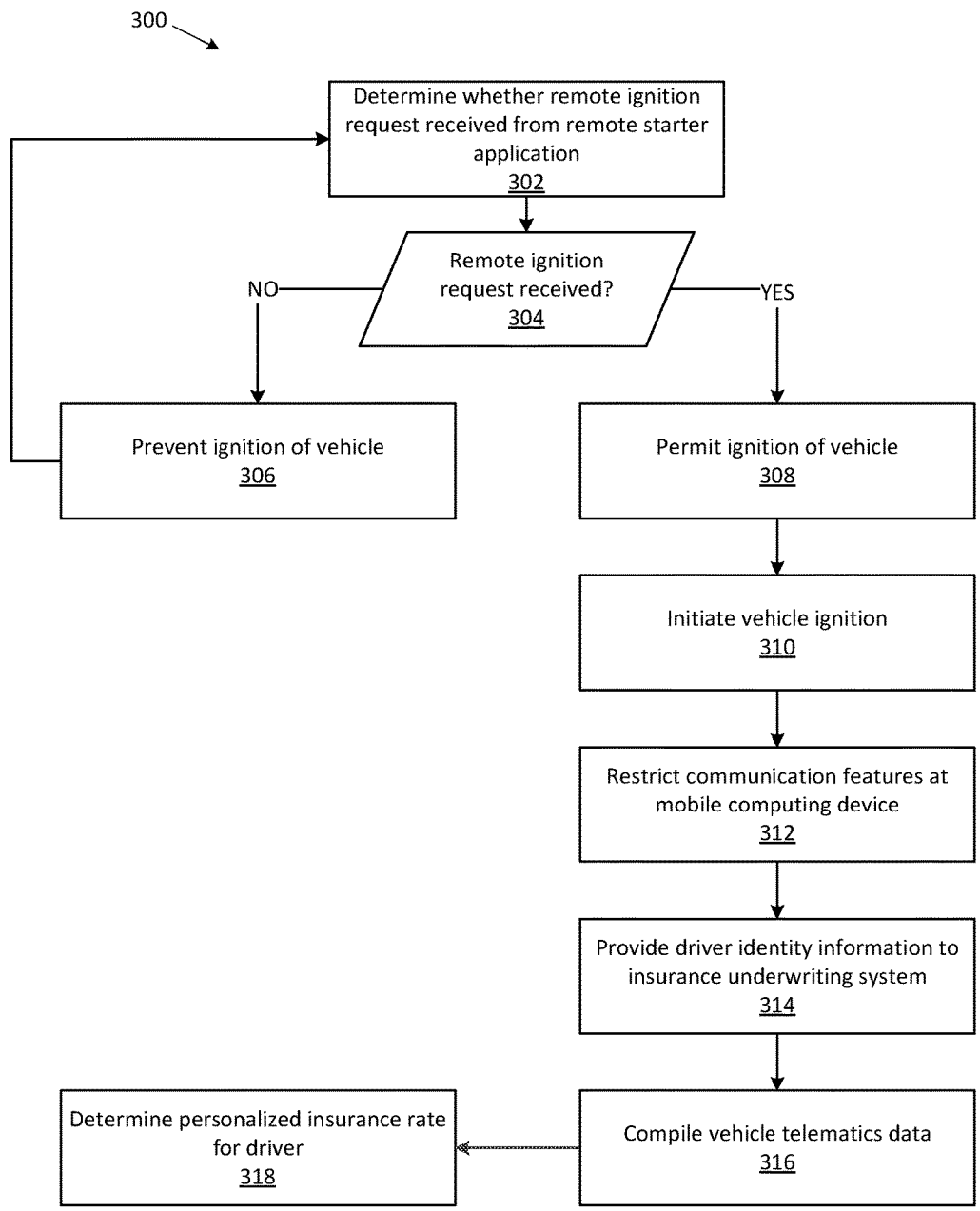
FIG. 3 is a flowchart of example method steps for encouraging safe driving behaviors using a remote starter device installed at a vehicle.

Referring now to FIG. 3, a flowchart 300 of example method steps for encouraging safe driving behaviors using a remote starter device installed at a vehicle is shown. As noted above, the remote starter device determines whether the remote starter application is operating at the mobile device. In order to determine whether the remote starter application is operating at the mobile device, the remote starter device may determine whether a remote ignition request has been received from the remote starter application (block 302). The remote starter application may be configured to provide the remote ignition request in response to receipt of user input at the remote starter application (e.g., when a user selects a button to generate the remote ignition request). The remote starter application may additionally or alternatively be configured to automatically transmit a remote ignition request at periodic intervals. In this way, the remote starter device may automatically initiate vehicle ignition when the user comes within the vicinity of the vehicle with the mobile device.

If a remote ignition request has not been received at the remote starter device (block 304), then the remote starter device may prevent ignition of the vehicle (block 306). As noted above, the remote starter device may prevent ignition of the vehicle by not providing or blocking signals to the ignition system of the vehicle used to achieve vehicle ignition. If a remote ignition request has been received at the remote starter device (block 304), then the remote starter device may permit ignition of the vehicle (block 308). As also noted above, the remote starter device may permit vehicle ignition by providing or not blocking the signals to the ignition system used to achieve vehicle ignition.

Having received the remote ignition request from the remote starter application, the remote starter device may initiate vehicle ignition at the vehicle via the ignition interface (block 310). Upon vehicle ignition, the remote starter application may restrict communication features at the mobile device (block 312). The remote starter application may also be configured to restrict communications at the mobile device as soon as the remote starter application is launched. Restricting communications upon vehicle ignition will be discussed in further detail below.

The identity of the driver may also be provided to the insurance underwriting system, e.g., also upon ignition (block 314). Various approaches may be employed to identify the driver of the vehicle. In one example approach, the remote starter application may transmit information identifying the user of the mobile application to the insurance underwriting system. The insurance underwriting system may thus determine that the user operating the mobile device is the driver of the vehicle. The remote starter device may require a password or personal identification number (PIN) from the user in order to generate the remote ignition request. Having identified the driver of the vehicle, the insurance underwriting system may collect vehicle telematics data as discussed above (block 316) and determine a personalized insurance rate for the driver (block 318). Determining a personalized insurance rate for the driver will also be discussed in further detail below.

In some example embodiments, the identity of the driver may be provided to the insurance underwriting system (block 314) before vehicle ignition is initiated (block 310). In this example, the insurance underwriting system may verify that the individual is authorized to operate the vehicle. As a result, the insurance underwriting system may control which individuals may remotely initiate vehicle ignition via the remote starter application. For example, the remote starter application may be configured such that it does not transmit a remote ignition request until it receives confirmation from the insurance underwriting system. The remote underwriting system may be configured to determine whether an individual is authorized to operate the vehicle based, for example, on an authorized driver list maintained at the insurance underwriting system and associated with the vehicle. Accordingly, the insurance underwriting system may be configured to send a confirmation to the remote starter application when the individual is included in the authorized driver list and to not send a confirmation to the remote starter application when the individual is not included in the authorized driver list. The insurance underwriting system may additionally or alternatively be configured to determine whether the individual is authorized to drive in general, for example, whether the individual has a valid license to drive (e.g., when the individual is underage or when the individual has a suspend or revoked license to drive). Accordingly, the insurance underwriting system may be configured to access one or more remote third-party systems (e.g., a system maintained by a Department of Motor Vehicles) in order to determine whether the individual is authorized to operate the vehicle.

Restricting Communications

Figure 4:
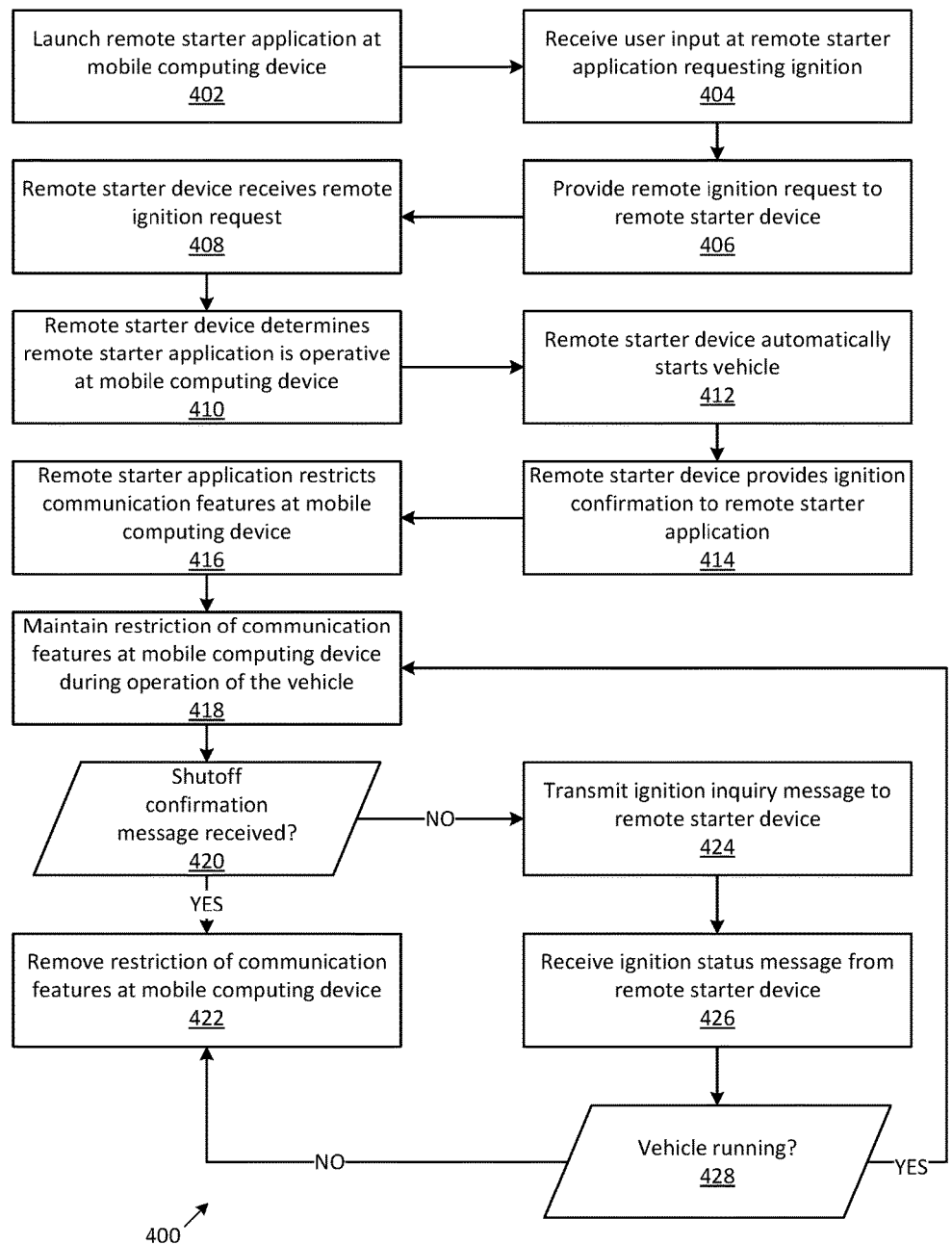
FIG. 4 is a flowchart of example method steps for restricting communications at a mobile computing device using a remote starter device installed at a vehicle.

Referring now to FIG. 4, a flowchart 400 of example method steps for restricting communications at a mobile device using a remote starter device is shown. A user may launch the remote starter application at the mobile device (block 402). The remote starter application may receive user input requesting remote ignition of the vehicle (block 404), e.g., via selection of a button at a user interface display. In response to receipt of the user input requesting remote ignition of the vehicle, the remote starter application may generate a remote ignition request and transmit the remote ignition request to the remote starter device via the mobile device (block 406). The communication module of the remote starter device may receive the remote ignition request and forward the remote ignition request to the processing module of the remote starter device for processing (block 408). Having received the remote ignition request, the remote starter device may determine that the remote starter application is operative at the mobile device and permit ignition of the vehicle (block 410). The ignition interface of the remote starter device may then initiate vehicle ignition by providing the necessary signals to the ignition system of the vehicle (block 412). In some example embodiments, the remote starter device may provide an ignition confirmation message back to the remote starter application upon successful vehicle ignition (block 414). In these example embodiments, the remote starter application may restrict communication features at the mobile device upon receipt of the ignition confirmation message from the remote starter device (block 416). In other example embodiments, the remote starter application may restrict communication features at the mobile device upon receipt of the user input requesting remote vehicle ignition (block 404) or when the remote starter application is launched (block 402).

Communication features may include, for example, text messaging, multimedia messaging, phone calling, video chatting, Internet access, email access, short-range wireless communication (e.g., infrared, Bluetooth), and the like. Restricting communication features may include preventing the mobile communication device from transmitting some or all communications via one or more of the communication features. Restricting communication features may also include preventing the mobile communication device from indicating that a communication has been received at the mobile device via one or more of the communication features. As an example, the remote starter application may prevent a driver from accessing a text messaging feature and a phone calling feature at the mobile device upon vehicle ignition. The remote starter application may prevent the user from accessing communication features by, for example, locking a display screen or, additionally or alternatively, ignoring user input associated with attempts to access the communication features. As another example, the remote starter application may prevent the mobile device from indicating that a text message or phone call has been received at the mobile device. The remote starter application may prevent the mobile device from indicating a text message or phone call was received by suppressing any visual notifications, audible notifications, haptic notifications (e.g., vibrations), or other types of notifications the mobile device may employ to indicate receipt of a new communication. Restricting communication features may also include preventing some types of communication features while permitting other types of communication features, e.g., preventing text messaging but permitting short-range messaging over Bluetooth. Restricting communication features may also include preventing some communications while permitting other communications, e.g., permitting communications to or from a contact that is designated as an emergency contact but preventing communications to or from contacts that are not designated as an emergency contact.

The remote starter application may maintain the restriction on communication features at the mobile device during operation of the vehicle (block 418). In some example embodiments, the remote starter application may maintain the restriction on the communication features at the mobile device until a shutoff confirmation message is received from the remote starter device. If a shutoff confirmation message is received at the remote starter application from the remote starter device (block 420), then the remote starter application may remove the restriction on the communication features at the mobile device (block 422). In some example embodiments, the remote starter application may be configured to query the remote starter device for the status of the vehicle. In this way, the remote starter application includes a way to remove the restriction on the communication features in case a shutoff confirmation message is not received at the remote starter application. Accordingly, if the remote starter application does not receive a shutoff confirmation message from the remote starter device (block 420), the remote starter application may transmit an ignition inquiry message to the remote starter device (block 424) in order to determine whether the vehicle is still running. The remote starter application may be configured to transmit the ignition inquiry message to the remote starter device in response to receipt of user input from the user or, additionally or alternatively, at periodic intervals. In response to receipt of the ignition inquiry message, the remote starter device may determine the current status of the vehicle, e.g., whether the vehicle is running. The remote starter device may determine whether the vehicle is running via the ignition interface connected to the ignition system of the vehicle or, additionally or alternatively, via the vehicle telematics device. The remote starter device may then provide an ignition status message to the remote starter application indicating whether the vehicle is still running or has been shut off (block 426). If the ignition status message indicates the vehicle is still running (block 428), then the remote starter application may maintain the restriction on the communication features at the mobile device (block 418). If the ignition status message indicates that the vehicle is not running (block 428), e.g., that the vehicle has been shut off, then the remote starter application may remove the restriction on the communication features at the mobile communication device (block 420). As used in this description, the remote starter device is referred to as providing confirmation and status messages and the remote starter application is referred to as providing notification messages simply for the purpose of clarity. Confirmation messages, status messages, and notification messages may, in general, refer to messages that indicate whether the vehicle achieved ignition, is presently running, or shut off. Accordingly, the terms confirmation message, status message, and notification message may be used interchangeably.

Figure 5:
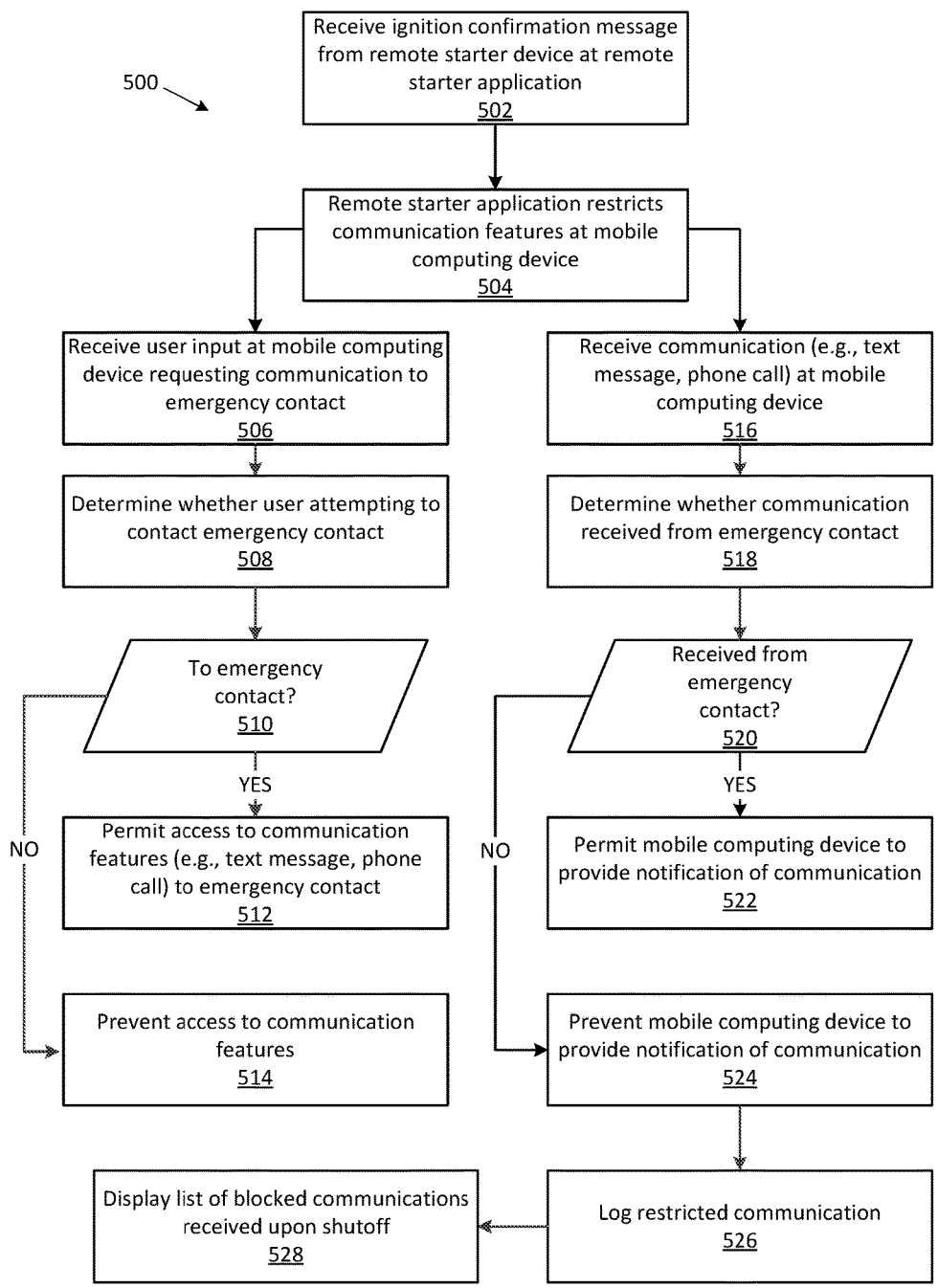
FIG. 5 is another flowchart of example method steps for restricting communications at a mobile computing device using a remote starter device installed at a vehicle.

As noted above, restricting communication features at the mobile device may include permitting some communications at the mobile device (e.g., communications to and from emergency contacts) while preventing other communications. In FIG. 5, another flowchart 500 of example method steps for restricting communications at a mobile device using a remote starter device is shown. Upon receipt of an ignition confirmation message at the remote starter application from the remote starter device (block 502), the remote starter application may restrict communication features at the mobile device (block 504) as noted above.

If the user attempts to initiate a communication with a contact while the restriction is in place (block 506), the remote starter application may determine whether the user is attempting to communicate with a contact designated as an emergency contact (block 508). If the user is attempting to contact an emergency contact (block 510), then the remote starter application may permit the user to access one or more communication features to initiate a communication with the emergency contact (block 512). If the user is attempting to initiate a communication with a contact that is not designated as an emergency contact (block 510), then the remote starter application may prevent the user from accessing communication features at the mobile device (block 514).

If a communication is received at the mobile device while the restriction is in place (block 516), then the remote starter application may determine whether the communication was received from a contact designated as an emergency contact (block 518). If the remote starter application determines the mobile device received the communication from an emergency contact (block 520), then the remote starter application may permit the mobile device to provide notification (e.g., visual, audible, haptic notification, or a combination of such) that the communication was received (block 522). If the remote starter application determines the mobile device received the communication from a contact that is not designated as an emergency contact (block 520), then the remote starter application may prevent the mobile device from providing notification that the mobile device received the communication (block 524). When the remote starter application prevents notification of a communication received at the mobile computing device, the remote starter application may log the communication in a list of blocked communications (block 526). Once the remote starter application removes the restriction on the communication features, the remote starter application may present a list of communications received at the mobile device while the restriction was in place (block 528).

As also noted above, the remote starter device prevents ignition of the vehicle unless a remote starter application is operating at a mobile device. As a result, an insurance underwriting system may identify the driver of the vehicle based on the mobile device at which the remote starter application is operative. Being able to identify the driver of the vehicle introduces the possibility of providing vehicle insurance associated with the driver of the vehicle rather than the vehicle itself. The insurance underwriting system may maintain a driving history for the driver and determine a personalized insurance rate for the driver based on the driving behaviors and habits of the driver. The insurance underwriting system may determine a risk profile for the driver and an appropriate personalized insurance rate for the risk profile.

Additionally, drivers may be able to affect their personalized insurance rate by engaging in safe or unsafe driving habits. As an example, where a driving history shows that a driver tends to engage in relatively unsafe driving habits, the insurance rate determination module of an insurance underwriting system may assess the driver to be a relatively high insurance risk and determine a relatively high personalized insurance rate for the driver. In contrast, where the driving history for the driver shows that the driver tends to engage in relatively safe driving habits, the insurance rate determination module of the insurance underwriting system may assess the driver to be a relatively low insurance risk and determine a relatively low personalized insurance rate for the driver. As a result, the driver is encouraged to engage in safe driving habits where driving behaviors affect the personalized insurance rate for the driver. The insurance underwriting system may be configured to determine a personalized insurance rate for the driver upon request (e.g., from the driver, from the insurance provider, or both) as well as at periodic intervals (e.g., once a year during a policy renewal period or more frequently such as once a month). Additionally, the personalized insurance rate may correspond to insurance coverage for a traditional policy term (e.g., one year) or for a single trip in the vehicle (e.g., a PAYD personalized insurance rate). Personalized insurance rates will be discussed in further detail below.

In FIGS. 6A-B, example implementations of respective display interfaces 600a and 600b of the remote starter application 602 are shown. In FIG. 6A, an example of an implementation of a display interface 600a for a remote starter application 602 is shown. The display interface in FIG. 6A may include a button 604 to remotely initiate vehicle ignition. The display interface 600a may also include password element 606 at which a user may provide a password to have access to the remote ignition feature. As seen in FIG. 6A, the remote starter application 602 may provide vehicle information 608, e.g., vehicle make, model, year, and the name of the vehicle owner 610. The remote starter application 602 may also identify the driver 612 of the vehicle as the user of the mobile device on which the remote starter application is operating. It will be appreciated that the driver of the vehicle may or may not be the vehicle owner. As discussed above, selecting the button to remotely initiate vehicle ignition may activate restrictions on communication features at the mobile device.

In FIG. 6B, another example of an implementation of a display interface 600b for a remote starter application 602 is shown. The interface 600b in FIG. 6B may be presented to the driver, once the driver has remotely initiated vehicle ignition using the remote starter application 602. As seen in FIG. 6B, the remote starter application restricts communication features (e.g., text message, phone calls) at the mobile computing device. The interface may include a button 614 for submitting an ignition status inquiry to the remote starter device installed at the vehicle. In this way, the remote starter application 602 may determine whether the vehicle is still running or has been shut off in the event that the remote starter application fails to receive a shutoff confirmation message from the remote starter device. The display interface 600b, in this example, also includes ignition status information 616 indicating, for example, whether the vehicle is running and the last time the vehicle status information was updated. The display interface 600b, in this example, also includes a button 618 to initiate a communication (e.g., text message, phone call) with a contact designated as an emergency contact. It will be appreciated with the benefit of this disclosure that the remote starter application may provide additional or alternative display interfaces relating to restricting communications at the mobile device that include additional or alternative information as well as additional or alternative interface elements.

Personalized Insurance Rates

Figure 7:
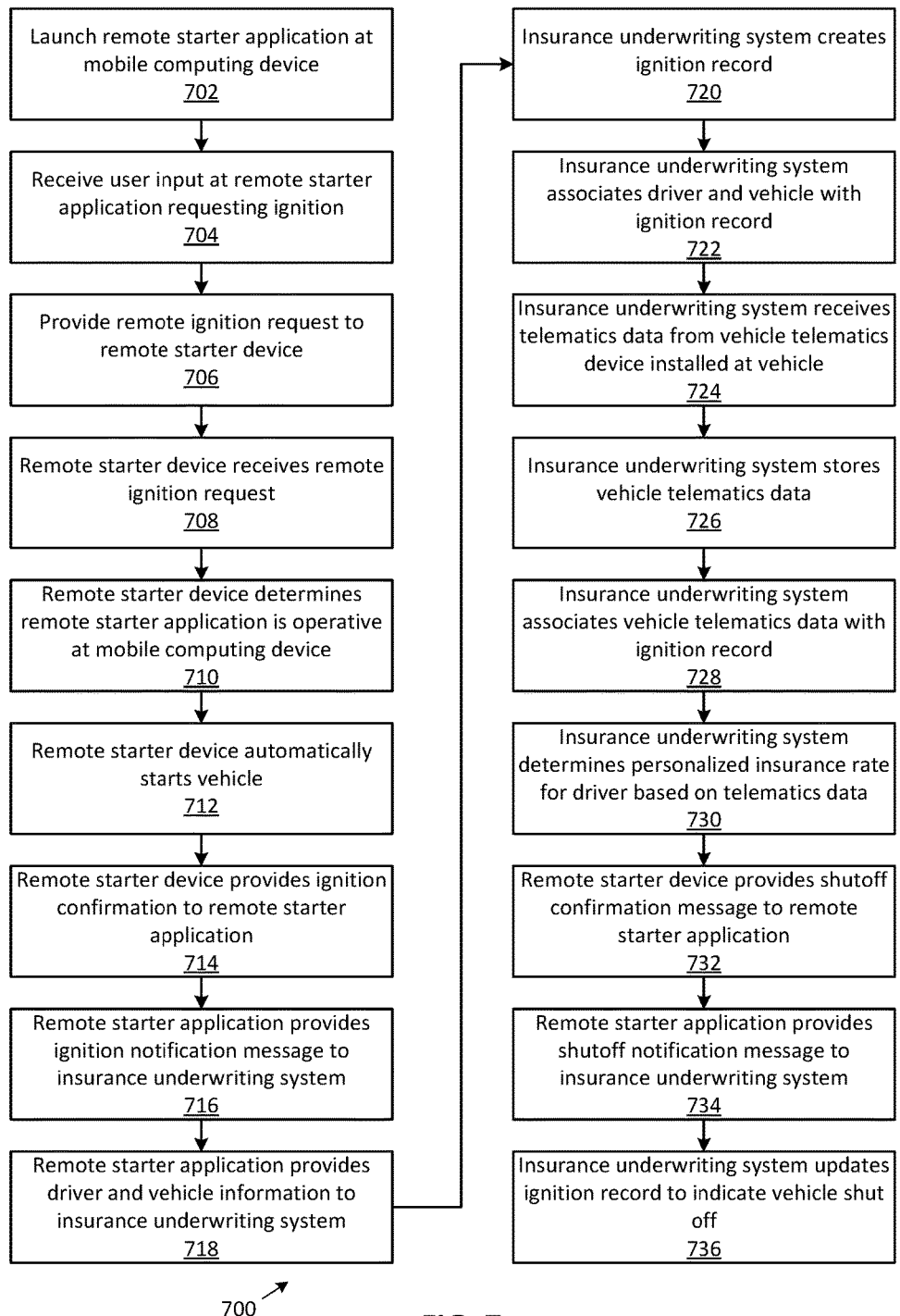
FIG. 7 is a flowchart of example method steps for identifying a driver of a vehicle and maintaining a driving history for the driver.

Referring to FIG. 7, a flowchart 700 of example method steps for identifying a driver of a vehicle and maintaining a driving history for the driver is shown. As mentioned above, a user may launch the remote starter application at the mobile device (block 702), and provide user input requesting remote ignition of the vehicle via the remote starter device (block 704). The remote starter application may provide the remote ignition request via the mobile device (block 706) and the remote starter device installed at the vehicle may receive the ignition request (block 708). Upon receipt of the remote ignition request from the remote starter application, the remote starter device may determine that the remote starter application is operative at the mobile device (block 710), and initiate vehicle ignition (block 712). The remote starter device may provide an ignition confirmation message to the remote starter application upon ignition of the vehicle (block 714). A timing device (e.g., a clock) at the remote starter may provide date and time information that the remote starter device may include in the ignition confirmation message.

In response to receipt of the ignition confirmation message, the remote starter application may transmit an ignition notification message to the insurance underwriting system (block 716). The remote starter application may include in the ignition notification message the date and time information from the ignition confirmation message. Alternatively, a timing device at the mobile device may provide date and time information that the remote starter application may include in the ignition notification message. The ignition notification message may also include geographic location information (e.g., GPS coordinates) indicating a geographic location where the vehicle achieved ignition. The geographic location information may be provided by a GPS module installed at the mobile device as shown by way of example in FIG. 2. In other example embodiments, the remote starter device may include a GPS module, and the remote starter device may include geographic location information from its GPS module in the ignition confirmation message. In further example embodiments, the vehicle telematics device may include a GPS module, and the remote starter device may query the vehicle telematics device for geographic location information to include in the ignition confirmation message.

The remote starter application may also provide driver information and vehicle information to the insurance underwriting system (block 718). The driver information may directly identify the driver (e.g., by first and last name), or may indirectly identify the driver by a unique identifier that can be used to determine the identity of the driver (e.g., a customer number or mobile phone number). The insurance underwriting system may be configured to determine the identity of the user based on the unique identifier by, for example, querying a customer database using the customer number or querying a remote third-party system using the mobile phone number. The vehicle information may include, for example, the make, model, year, vehicle identification number (VIN), and the like. In some example embodiments, the remote starter application may include the driver information, the vehicle information, or a combination of such in the ignition notification message sent to the insurance underwriting system. In other example embodiments, the remote starter application may provide the driver information or vehicle information in separate messages to the insurance underwriting system.

The driver information and vehicle information may be stored at a respective memory of the mobile device, the remote starter device, or the vehicle telematics device. Accordingly, the remote starter device may, in some example embodiments, include the driver information or vehicle information in the ignition confirmation message provided to the remote starter application. Furthermore, it will be recognized that, in some example embodiments, the remote starter device or the vehicle telematics device may be configured to provide the ignition confirmation message, the driver information, and the vehicle information directly to the insurance underwriting system rather than providing the ignition confirmation message to the remote starter application that, in turn, provides an ignition notification message to the insurance underwriting system. In general, it will be appreciated with the benefit of this disclosure that various approaches may be employed with respect to notifying the insurance underwriting system that the vehicle has achieved ignition and providing ignition information, driver information, and vehicle information to the insurance underwriting system.

In response to receipt of an ignition notification message from the remote starter application (or an ignition confirmation message from the remote vehicle starter or vehicle telematics device), the insurance underwriting system may create a new ignition record in the ignition record database (block 720). The insurance underwriting system may associate the ignition record with the individual determined to be the driver of the vehicle (block 722). The insurance underwriting system may associate the driver and the newly created ignition record by, for example, establishing a relationship (or otherwise associating) the newly created ignition record with a customer record in a customer database. Likewise, the insurance underwriting system may associate the ignition record with the vehicle by, for example, establishing a relationship between (or otherwise associating) the ignition record and a vehicle record in a vehicle database. The insurance underwriting system may configure the ignition record to include (or otherwise be associated with) the driver information and vehicle information. The insurance underwriting system may also configure the ignition record to include (or otherwise be associated with) ignition timestamp information indicating the date and time at which the vehicle achieved ignition as well as ignition location information indicating a geographic location at which the vehicle achieved ignition.

As discussed above, the insurance underwriting system may also receive vehicle telematics data from the vehicle telematics device during operation of the vehicle (block 724). The insurance underwriting system may store the vehicle telematics data in one or more records of a vehicle telematics database (block 726) and associate the vehicle telematics records with the ignition record created upon vehicle ignition (block 728). In this way the insurance underwriting system may be able to analyze driving behaviors of the driver for a particular trip in the vehicle. Subsequent ignition records for subsequent trips may be associated with subsequent vehicle telematics records created for vehicle telematics data collected during those subsequent trips.

Based on the vehicle telematics data collected from the vehicle, the insurance rate determination module at the insurance underwriting system may determine a personalized insurance rate for the driver (block 730). The personalized insurance rate may be based, at least in part, on vehicle telematics data obtained for a presently ongoing trip in the vehicle, on vehicle telematics data obtained for previous trips by the driver, or on a combination of presently obtained and previously obtained vehicle telematics data associated with the driver.

The insurance underwriting system may collect and store vehicle telematics data provided by the vehicle telematics device until the vehicle is shut off. When the driver shuts off the vehicle, the remote starter device may provide a shut off confirmation message to the remote starter application at the mobile device (block 732). In response to receipt of the shutoff confirmation message from the remote starter device, the remote starter application may provide a shutoff notification message to the insurance underwriting system (block 734). Similar to the ignition notification message, the shutoff notification message may indicate the date and time at which the vehicle shut off as well as location information (e.g., GPS coordinates) that indicates a geographic location where the vehicle shut off. A timing device (e.g., a clock) at the mobile device, remote starter device, or vehicle telematics device may provide the shutoff timing information. Likewise, a GPS module at the mobile device, remote starter device, or vehicle telematics device may provide the shutoff location information. It will also likewise be appreciated that the insurance underwriting system may receive a shutoff notification message from the remote starter device or the vehicle telematics device directly. In response to receipt of the shutoff notification message, the insurance underwriting system may update the ignition record to indicate that the vehicle shut off (block 736). The insurance underwriting system may configure the ignition record to include (or otherwise be associated with) the shutoff timestamp information indicating the date and time at which the vehicle shut off as well as the location information indicating the geographic location at which the vehicle shut off.

It will be appreciated that, by collecting ignition records and associated vehicle telematics records, the insurance underwriting system may build a personal driving history for the driver on which the personalized insurance rate for the driver may be, at least in part, determined. The insurance underwriting system described in this disclosure thus introduces alternative approaches to providing insurance coverage for operating a vehicle. One such approach includes providing insurance coverage for individual trips taken by the driver. The approach to providing insurance coverage for individual trips may be referred to as pay-as-you-drive (PAYD) insurance. For PAYD insurance, a driver may pay a one-time insurance premium for insurance coverage during a single trip in the vehicle. Accordingly, in some situations, the driver may pay the one-time insurance premium each time the driver desires to take a trip in a vehicle. As discussed further below, an insurance rate for the driver may be based, at least in part, on a driving history of the driver and observed driving behaviors during the trip.

Figure 8:
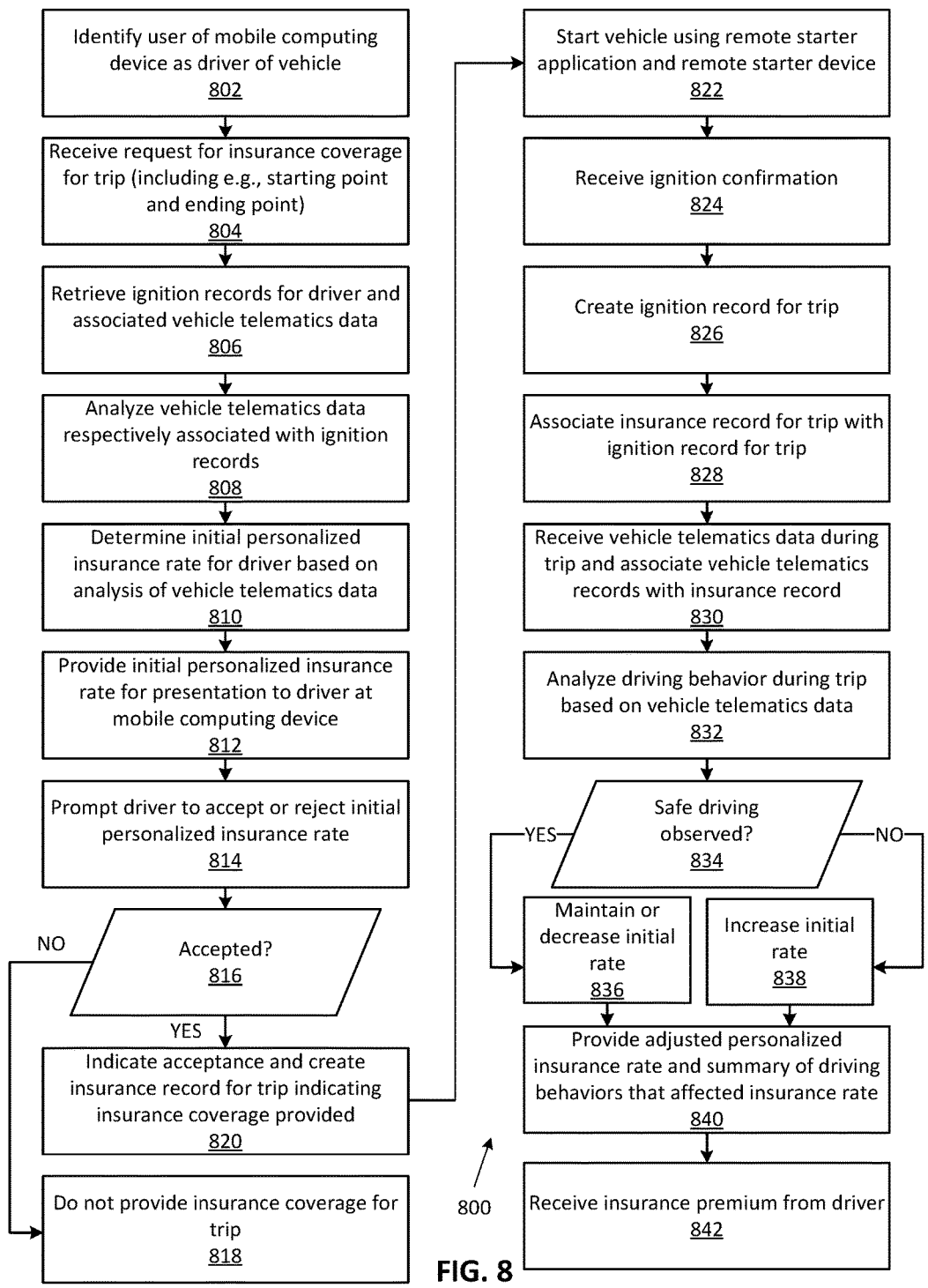
FIG. 8 is a flowchart of example method steps for providing personalized insurance rates.

Referring to FIG. 8, a flowchart 800 of example method steps for providing personalized insurance rates is shown. The insurance underwriting system may first identify the driver of the vehicle (block 802), e.g., in accordance with the approach set forth above where the user of the mobile device that remotely initiates vehicle ignition is identified as the driver of the vehicle. The driver may submit a request for PAYD insurance coverage via the remote starter application operating at the mobile device (block 804). Upon receipt of the request for PAYD insurance coverage, the insurance underwriting system may retrieve the driving history for the driver, e.g., the ignition records and vehicle telematics records associated with the driver (block 806). The insurance underwriting system may analyze the ignition records and the vehicle telematics records (block 808) in order to determine a risk profile and corresponding personalized insurance rate for the driver (block 810). As noted above, the insurance underwriting system may employ conventional approaches to determining a risk profile and corresponding insurance rate for the driver based on the driving history and driving behaviors of the driver.

In some example implementations, the remote starter application may include input elements (not shown) for specifying a starting and ending location for the trip. The request for insurance coverage may include the starting and ending points. The insurance rate determination module of the insurance underwriting system may thus factor the starting and ending points into the determination of the personalized insurance rate for the driver. For example, if statistical data indicates that the driver will be traveling an area of relatively high risk or relatively low risk, the insurance rate determination module may determine a relatively high or relatively low personalized insurance rate for the driver respectively. In some example embodiments, the insurance rate determination module may be configured to determine one or more routes from the starting point to the ending point specified in the request. The insurance rate determination module may then determine which route is least risky, recommend the least risky route to the driver with a corresponding personalized insurance rate. The insurance underwriting system may then monitor the progress of the vehicle as it travels from the starting point to the ending point along the route and determine whether the driver maintains or deviates from the route. If the driver deviates from the route, then the insurance underwriting system may adjust the personalized insurance rate for the driver or assess a penalty against the driver. In other example embodiments, the insurance rate determination module may identify multiple routes from the starting point to the ending point and determine a respective personalized insurance rate for each possible route. The insurance underwriting system may provide the list of possible routes and respective insurance rates to the remote starter application for display to the user. The user may then select one of the routes and receive insurance coverage at the personalized insurance rate associated with the selected route.

The insurance underwriting system may provide an initial personalized insurance rate to the driver (block 812). The insurance underwriting system may provide the initial personalized insurance rate to the remote starter application operating at the mobile device, and the remote starter application may display the initial personalized insurance rate to the driver. The remote starter application may prompt the driver to either accept or reject the initial personalized insurance rate offered (block 814). If the driver does not accept the initial personalized insurance rate offered (block 816), then an insurance provider may not provide insurance coverage for the driver during the trip (block 818). Additionally or alternatively, the insurance underwriting system may determine and offer a second personalized insurance rate if the driver rejects the first personalized insurance rate offered. If the driver does accept the initial personalized insurance rate offered (block 816), then the remote starter application may provide an acceptance message to the insurance underwriting system that creates an insurance record for the driver indicating that an insurance provider will provide insurance coverage for the driver during the trip (block 820).

The driver may then proceed to remotely start the vehicle using the remote starter application (block 822) and begin the trip. As discussed above, the insurance underwriting system may receive an ignition confirmation message (block 824) and create an ignition record for the vehicle (block 826). The insurance underwriting system may associate the insurance record with the ignition record (block 828). During the trip, the insurance underwriting system may collect vehicle telematics data and associate the vehicle telematics records with the insurance record for the driver (block 830). In this way, the insurance underwriting system may monitor and analyze the driving behaviors of the driver during the trip (block 832).

The insurance underwriting system may encourage safe driving during the trip by adjusting the initial personalized insurance rate based on the driving behaviors observed during the trip. If the insurance underwriting system observes relatively safe driving behaviors during the trip (block 834), then the insurance underwriting system may maintain the initial personalized insurance rate or reduce the initial personalized insurance rate for the driver (block 836). If the insurance underwriting system observes relatively unsafe driving behaviors during the trip (block 838), then the insurance underwriting system may increase the initial personalized insurance rate for the driver (block 838).

The insurance underwriting system may assess whether a driving behavior is a safe or unsafe driving behavior based on the vehicle telematics data collected and the various characteristics discussed above. The insurance underwriting system may, for example, define exceeding the speed limit more than an average of five miles per hour during the trip as an unsafe driving behavior and define maintaining the speed limit during the trip as a safe driving behavior. As another example, the insurance underwriting system may define turning the vehicle at or above a predetermined speed as an unsafe driving behavior and define turning the vehicle at or below a predetermined speed as a safe driving behavior. A further example may define gradual stops (e.g., stopping the vehicle at or below a predetermined deceleration rate) as a safe driving behavior and define hard stops (e.g., stopping the vehicle at or above a predetermine deceleration rate) as an unsafe driving behavior. Such driving behaviors may be defined bases on the various characteristics set forth above and indicated by the vehicle telematics data provided by the vehicle telematics device. It will be appreciated with the benefit of this disclosure that the insurance underwriting system may define many more safe and unsafe driving behaviors that can affect the personalized insurance rate for the driver.

The insurance premium paid by the driver may thus be based on an adjusted insurance rate. The insurance underwriting system may generate a summary of driving behaviors during the trip that contributed to the determination of whether to adjust the initial personalized insurance rate and provide the driving behavior summary to the remote starter application for display to the driver (block 840). The driving behavior summary may identify specific driving behaviors that resulted in a relatively higher or lower adjusted personalized insurance rate. the insurance underwriting system may associate driving behaviors with respective amounts by which the initial personalized insurance rate may be adjusted, e.g., by adding the amount to or subtracting the amount from the initial personalized insurance rate. The driver may thus pay the insurance provider an insurance premium corresponding to the final personalized insurance rate that may be the same as the initial personalized insurance rate or may be an adjusted personalized insurance rate (block 842). It will be appreciated that alternative approaches to adjusting the personalized insurance rate may be employed. As one example, the driver may pay an insurance premium corresponding to the initial personalized insurance rate before the trip begins, and the insurance provider may provide a refund to the driver or assess penalties against the driver at the conclusion of the trip based on the driving behaviors observed during the trip.

Figure 9:
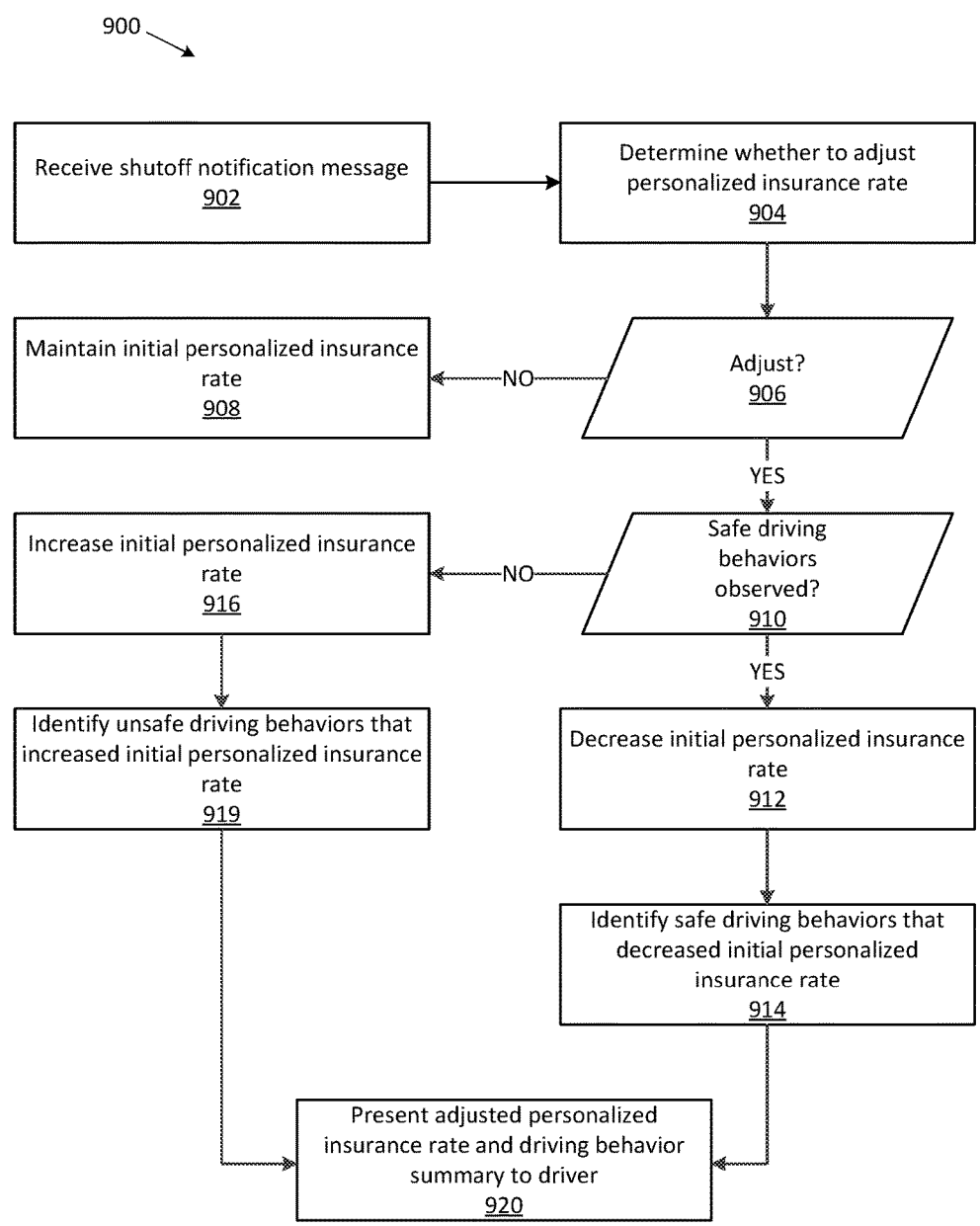
FIG. 9 is a flowchart of example method steps for adjusting the initial personalized insurance rate.

Referring to FIG. 9, a flowchart 900 of example method steps for adjusting the initial personalized insurance rate at the conclusion of a trip is shown. The insurance underwriting system may receive a shutoff notification message (block 902), which may indicate that the trip has concluded. The insurance underwriting system may then determine whether or not or adjust the initial personalized insurance rate for the driver (block 904). The insurance underwriting system may determine not to adjust the initial personalized insurance rate (block 906) where, for example, the insurance underwriting system observes both safe driving behaviors and unsafe driving behaviors during the trip such that the unsafe driving behaviors cancel out the safe driving behaviors. For example, the insurance underwriting system may assign positive ratings to safe driving behaviors and negative ratings to unsafe driving behaviors. The insurance underwriting system may then determine an overall driving behavior rating that corresponds to the sum total of the ratings for the safe and unsafe driving behaviors observed during the trip. Accordingly, the positive ratings for the safe driving behaviors will tend to raise the overall driving behavior rating while the negative ratings will tend to lower the overall driving behavior rating. The insurance underwriting system may maintain a reward threshold such that the insurance underwriting decreases the initial personalized insurance rate where the overall driving behavior rating is greater than or equal to the reward threshold. The insurance underwriting system may also maintain a penalty threshold such that the insurance underwriting system increases the initial personalized insurance rate where the overall driving behavior rating is less than or equal to the penalty threshold. In this example, the insurance underwriting system may maintain the initial personalize insurance rate (block 908) where the overall driving behavior rating does not cross either the reward threshold or the penalty threshold.

If the overall driving behavior rating crosses either the reward threshold or the penalty threshold, the insurance underwriting system may determine to adjust the initial personalized insurance rate (block 906). If safe driving behaviors are observed (block 910), e.g., if the overall driving behavior rating is greater than or equal to the reward threshold, then the insurance underwriting system may determine an adjusted personalized insurance rating by decreasing the initial personalized insurance rate (block 912). As noted above, the insurance underwriting system may also identify safe driving behaviors that contributed to the decrease of the initial personalized insurance rate (block 914). If unsafe driving behaviors are observed (block 910), e.g., if the overall driving behavior rating is less than or equal to a penalty threshold, then the insurance underwriting system may determine an adjusted personalized insurance rating by increasing the initial personalized insurance rate (block 916). The insurance underwriting system may similarly identify unsafe driving behaviors that contributed to the increase of the initial personalized insurance rate (block 918). The insurance underwriting system may provide a driving behavior summary to the remote starter application for presentation to the driver at the conclusion of the trip (block 920). The driving behavior summary may indicate the final personalized insurance rate (e.g., the initial or adjusted personalized insurance rate) as well as a list of driving behaviors that may have contributed to the determination of whether to adjust the initial insurance rate and driving behaviors that may have contributed to an adjustment of the initial insurance rate.

Figure 10A:
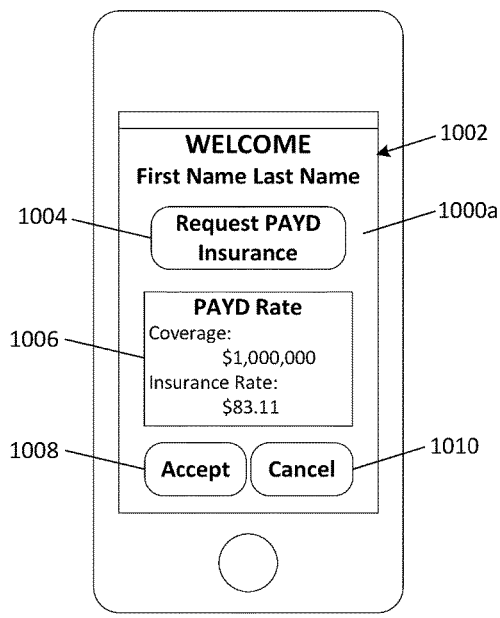
FIG. 10A is an example of an implementation of a display interface of the remote starter application for requesting pay-as-you-drive insurance.

Referring to FIGS. 10A-D, example implementations of respective user interfaces 1000*a-d* of a remote starter application 1002 are shown. In FIG. 10A, an example of a display interface 1000*a* of the remote starter application 1002 is shown. In FIG. 10A, the display interface 1000*a* includes a button 1004 to request PAYD insurance coverage from an insurance provider. When the user selects the button 1004, the remote starter application 1002 may transmit a request for a PAYD insurance quote to an insurance underwriting system via the mobile device. The remote starter application 1002 may also be configured to prompt the user for information regarding the type or amount of insurance coverage desired and includes this information in the request. As discussed above, the insurance underwriting system may determine an initial personalized insurance rate for the user and provide the initial personalized insurance rate to the remote starter application for presentation to the user. As seen in FIG. 10A, the PAYD insurance quote 1006 may identify the personalized insurance rate along with, e.g., the amount of coverage offered for the trip. The display interface may include buttons 1008 and 1010 allowing the user to accept or reject the PAYD insurance quote at the initial personalized insurance rate.

Figure 10B:
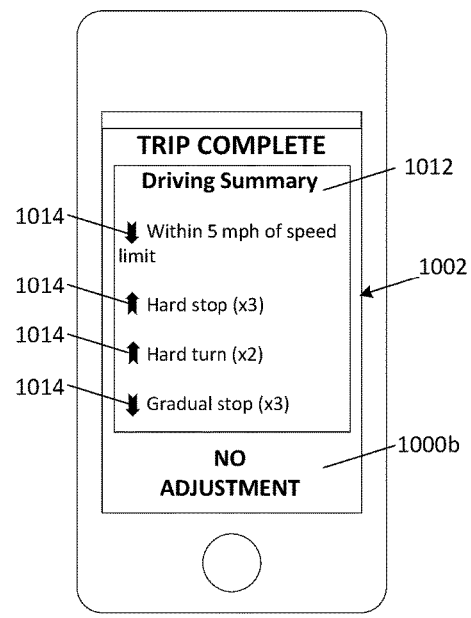
FIG. 10B is an example of an implementation of a display interface of the remote starter application that includes a driving behavior summary.

Referring to FIG. 10B, an example of an implementation of a display interface 1000*b* of the remote starter application 1002 displaying a driving behavior summary 1012 is shown. The remote starter application 1002 may display the driving behavior summary 1012 at the conclusion of a trip and indicate one or more driving behaviors 1014 of the driver during the trip. In this example, the list of driving behaviors 1014 includes both relatively safe and unsafe driving behaviors. Accordingly, the insurance underwriting system determined not to adjust the initial personalized insurance rate in this example.

Figure 10C:
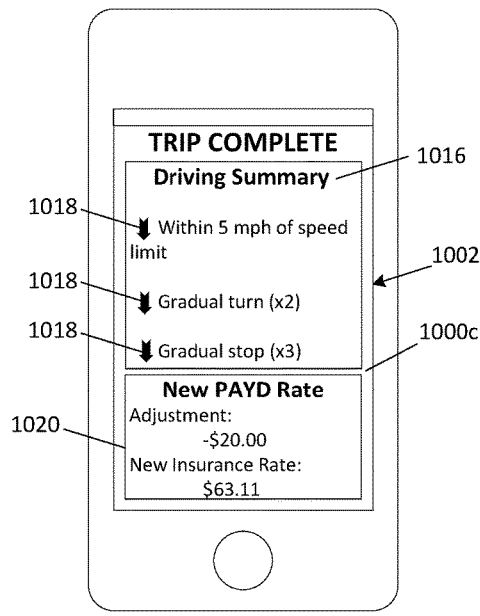
FIG. 10C is another example of an implementation of a display interface of the remote starter application that includes a driving behavior summary.
Figure 10D:
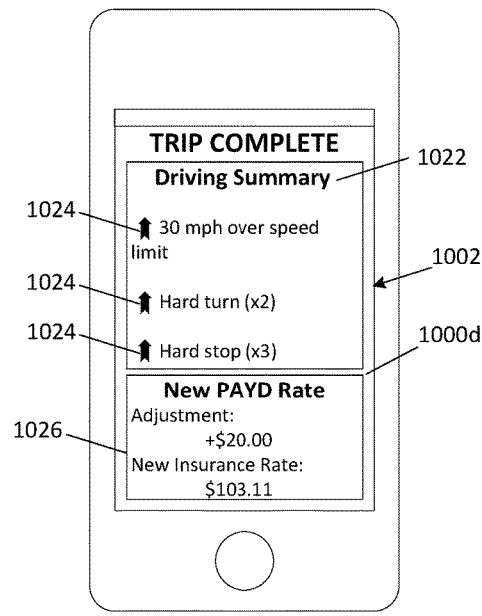
FIG. 10D is a further example of an implementation of a display interface of the remote starter application that includes a driving behavior summary.

In FIG. 10C, an example of an implementation of a display interface 1000*c* of the remote starter application 1002 where safe driving behaviors result in a decrease in the initial personalized insurance rate is shown. As seen in FIG. 10C, the driving summary 1016 indicates safe driving behaviors 1018 during the trip thereby resulting in a lower adjusted personalized insurance rate 1020. In FIG. 10D, an example of an implementation of a display interface 1000*d* of the remote starter application 1002 where unsafe driving behaviors result in an increase in the initial personalized insurance rate is shown. As seen in FIG. 10D, the driving summary 1022 indicates unsafe driving behaviors 1024 during the trip thereby resulting in a higher adjusted personalized insurance rate 1026. By basing driver insurance rates, at least in part, on driving behavior, safe driving behavior is thereby encouraged.

While the disclosure has been described with respect to specific examples including presently illustrative modes of carrying out the disclosure, a person having ordinary skill in the art, after review of the entirety disclosed herein, will appreciate that there are numerous variations and permutations of the above-described systems and techniques that fall within the spirit and scope of the disclosure. For example, the vehicle telematics device (rather than the insurance underwriting system) may monitor and analyze the driving behaviors during a trip and transmit a driving analysis to the insurance underwriting system such that the insurance underwriting system determines whether and how much to adjust a personalized insurance rate based on the driving analysis provided by the vehicle telematics device (rather than vehicle telematics data provided by the vehicle telematics device).

What is claimed is:

1. A method comprising:
connecting, via an interface of a device, to an ignition system of a vehicle;
determining, at the device, whether a mobile application is operating at a mobile computing device of a driver of the vehicle based on whether the device is in signal communication with the mobile application, the mobile application being configured to present an insurance rate for insurance coverage for taking a trip in the vehicle;
preventing ignition of the vehicle using the device until determining, at the device, that the mobile application is operating at the mobile computing device;
permitting ignition of the vehicle using the device responsive to determining, at the device, that the mobile application is operating at the mobile computing device; and
providing, from the device to the mobile application upon ignition of the vehicle, an ignition confirmation message;
wherein receipt of the ignition confirmation message at the mobile application causes the mobile application to:
display the insurance rate,
receive first input from the driver, the first input indicating whether the driver accepts or rejects the insurance rate, and
transmit, to an insurance underwriting system, an indication of whether the driver has accepted or rejected the insurance rate.

2. The method of claim 1, further comprising:
providing, from the device to the mobile application upon shutoff of the vehicle, an ignition shutoff message;
wherein receipt of the ignition shutoff message at the mobile application causes the mobile application to:
receive, from the insurance underwriting system, an adjusted insurance rate that is either higher or lower than the insurance rate, and
display the adjusted insurance rate.

3. The method of claim 2, wherein:
the adjusted insurance rate is determined by the insurance underwriting system based on one or more driving behaviors of the driver during the trip.

4. The method of claim 3, wherein:
an individual driving behavior of the one or more driving behaviors is associated with one of a speed of the vehicle during the trip, a turning of the vehicle during the trip, a braking of the vehicle during the trip, or an acceleration of the vehicle during the trip.

5. The method of claim 3, further comprising:
transmitting, to the insurance underwriting system, telematics data characterizing the one or more driving behaviors.

6. The method of claim 1, wherein:
receipt of the ignition confirmation message at the mobile application further causes the mobile application to:
prompt the driver for a starting point of the trip and an ending point of the trip,
receive second input from the driver, the second input indicating the starting point and the ending point, and
transmit, to the insurance underwriting system, information indicating the starting point and the ending point of the trip.

7. The method of claim 6, wherein:
the insurance rate is determined by the insurance underwriting system based, at least in part, of a route between the starting point and the ending point.

8. The method of claim 7, wherein:
receipt of the second input indicating the starting point and the ending point causes the mobile application to:
present a plurality of routes between the starting point and the ending point,
present, for each route of the plurality of routes, a corresponding insurance rate for insurance coverage for taking the trip via that route,
receive third input from the driver, the third input selecting one of the plurality of routes, and
transmit, to the insurance underwriting system, an indication of the route selected.

9. The method of claim 8, wherein:
the corresponding insurance rate for the route selected by the driver is adjusted to obtain an adjusted insurance rate responsive to determining that the driver deviated from the route selected during the trip, the adjusted insurance rate being higher than the corresponding insurance rate for the route selected.

10. The method of claim 1, wherein:
the insurance rate is based on a driving history associated with the driver of the vehicle.

11. A device comprising:
one or more processors;
an interface that is connectable to an ignition system of a vehicle;
memory storing instructions that, when executed by one or more of the processors, cause the device to:
determine whether a mobile application is operating at a mobile computing driver of a drive of the vehicle based on whether the device is in signal communication with the mobile application, the mobile application being configured to present an insurance rate for insurance coverage for taking a trip in the vehicle;
prevent ignition of the vehicle via the interface until determining that the mobile application is operating at the mobile computing device,
permit ignition of the vehicle via the interface responsive to determining that the mobile application is operating at the mobile computing device, and
provide an ignition confirmation message to the mobile application upon ignition of the vehicle;
wherein receipt of the ignition confirmation message at the mobile application causes the mobile application to:
display the insurance rate,
receive first input from the driver, the first input indicating whether the driver accepts or rejects the insurance rate, and
transmit, to an insurance underwriting system, an indication of whether the driver has accepted or rejected the insurance rate.

12. The device of claim 11, wherein:
the instructions, when executed by one or more of the processors, further cause the device to provide an ignition shutoff message upon shutoff of the vehicle;
wherein receipt of the ignition shutoff message at the mobile application causes the mobile application to:
  receive, from the insurance underwriting system, an adjusted insurance rate that is either higher or lower than the insurance rate, and
  display the adjusted insurance rate.

13. The device of claim 12, wherein:
the adjusted insurance rate is determined by the insurance underwriting system based on one or more driving behaviors of the driver during the trip.

14. The device of claim 13, wherein:
an individual driving behavior of the one or more driving behaviors is associated with one of a speed of the vehicle during the trip, a turning of the vehicle during the trip, a braking of the vehicle during the trip, or an acceleration of the vehicle during the trip.

15. The device of claim 13, wherein:
telematics data characterizing the one or more driving behaviors is transmitted to the insurance underwriting system.

16. The device of claim 11, wherein:
receipt of the ignition confirmation message at the mobile application further causes the mobile application to:
  prompt the driver for a starting point of the trip and an ending point of the trip,
  receive second input from the driver, the second input indicating the starting point and the ending point, and
  transmit, to the insurance underwriting system, information indicating the starting point and the ending point of the trip.

17. The device of claim 16, wherein:
the insurance rate is determined by the insurance underwriting system based, at least in part, of a route between the starting point and the ending point.

18. The device of claim 17, wherein:
receipt of the second input indicating the starting point and the ending point causes the mobile application to:
  present a plurality of routes between the starting point and the ending point,
  present, for each route of the plurality of routes, a corresponding insurance rate for insurance coverage for taking the trip via that route,
  receive third input from the driver, the third input selecting one of the plurality of routes, and
  transmit, to the insurance underwriting system, an indication of the route selected.

19. The device of claim 18, wherein:
the corresponding insurance rate for the route selected by the driver is adjusted to obtain an adjusted insurance rate responsive to determining that the driver deviated from the route selected during the trip, the adjusted insurance rate being higher than the corresponding insurance rate for the route selected.

20. The device of claim 11, wherein:
the insurance rate is based on a driving history associated with the driver of the vehicle.

* * * * *